(12) United States Patent
Miyakawa et al.

(10) Patent No.: US 8,971,689 B2
(45) Date of Patent: Mar. 3, 2015

(54) IMAGING DEVICE AND IMAGE-AUDIO PLAYBACK DEVICE

(75) Inventors: Yoshiaki Miyakawa, Tokyo (JP); Masafumi Oikawa, Mitaka (JP)

(73) Assignee: Nikon Corporation, Tokyo (JP)

( * ) Notice: Subject to any disclaimer, the term of this patent is extended or adjusted under 35 U.S.C. 154(b) by 17 days.

(21) Appl. No.: 13/594,124

(22) Filed: Aug. 24, 2012

(65) Prior Publication Data
US 2013/0058619 A1 Mar. 7, 2013

(30) Foreign Application Priority Data

Sep. 2, 2011 (JP) ................................. 2011-191267
Feb. 14, 2012 (JP) ................................. 2012-029351

(51) Int. Cl.
| H04N 5/77 | (2006.01) |
| H04N 5/783 | (2006.01) |
| H04N 9/82 | (2006.01) |
| H04N 5/232 | (2006.01) |
| G11B 27/00 | (2006.01) |
| G11B 27/034 | (2006.01) |

(52) U.S. Cl.
CPC ............... *H04N 5/77* (2013.01); *H04N 5/783* (2013.01); *H04N 9/8205* (2013.01); *H04N 5/23245* (2013.01); *G11B 27/005* (2013.01); *G11B 27/034* (2013.01)
USPC .......................................... 386/225; 348/161

(58) Field of Classification Search
USPC .......................................... 386/225; 348/161
See application file for complete search history.

(56) References Cited

U.S. PATENT DOCUMENTS

| 5,970,205 A * | 10/1999 | Nakamura et al. ............ 386/314 |
| 6,434,321 B1 * | 8/2002 | Eshima ......................... 386/343 |
| 2005/0237422 A1 * | 10/2005 | Kido ............................. 348/362 |
| 2006/0182436 A1 | 8/2006 | Tabuchi et al. |
| 2011/0116759 A1 * | 5/2011 | Oikawa ......................... 386/226 |

FOREIGN PATENT DOCUMENTS

| JP | A-H10-056619 | 2/1998 |
| JP | A-2003-101914 | 4/2003 |

(Continued)

OTHER PUBLICATIONS

Japanese Office Action issued in Japanese Application No. 2011-191267 mailed Jul. 23, 2013 (with translation).

(Continued)

*Primary Examiner* — Thai Tran
*Assistant Examiner* — Girumsew Wendmagegn
(74) *Attorney, Agent, or Firm* — Oliff PLC

(57) ABSTRACT

An imaging device includes: a storage unit that sequentially stores a plurality of frame images and raw recorded audio data; a unit that generates slow-motion movie image data to be played at a second frame rate lower than a first frame rate, based on the plurality of frame images stored in the storage unit during a first predetermined duration; a unit that generates at least one set of still image data on the basis of at least one frame image from among the plurality of frame images stored in the storage unit during the first predetermined duration; a unit that generates audio data on the basis of the raw recorded audio data stored during a second predetermined duration longer than the first predetermined duration; and a unit that records the audio data generated, in association with the slow-motion movie image data generated and the still image data generated.

28 Claims, 12 Drawing Sheets

(56) References Cited

FOREIGN PATENT DOCUMENTS

| | | |
|---|---|---|
| JP | A-2005-117083 | 4/2005 |
| JP | A-2006-107591 | 4/2006 |
| JP | A-2006-222771 | 8/2006 |
| JP | A-2008-148085 | 6/2008 |
| JP | A-2008-153795 | 7/2008 |
| JP | A-2008-283708 | 11/2008 |
| JP | A-2009-296539 | 12/2009 |
| JP | A-2010-200079 | 9/2010 |
| JP | A-2010-272940 | 12/2010 |
| JP | A-2011-55386 | 3/2011 |
| JP | A-2011-103642 | 5/2011 |
| JP | A-2011-120306 | 6/2011 |
| JP | A-2011-130378 | 6/2011 |

OTHER PUBLICATIONS

Nov. 19, 2013 Notification of Reason(s) for Refusal issued in Japanese Patent Application No. 2012-029351 (with English-language translation).

Mar. 18, 2014 Office Action issued in Japanese Patent Application No. 2011-191267 (with translation).

\* cited by examiner

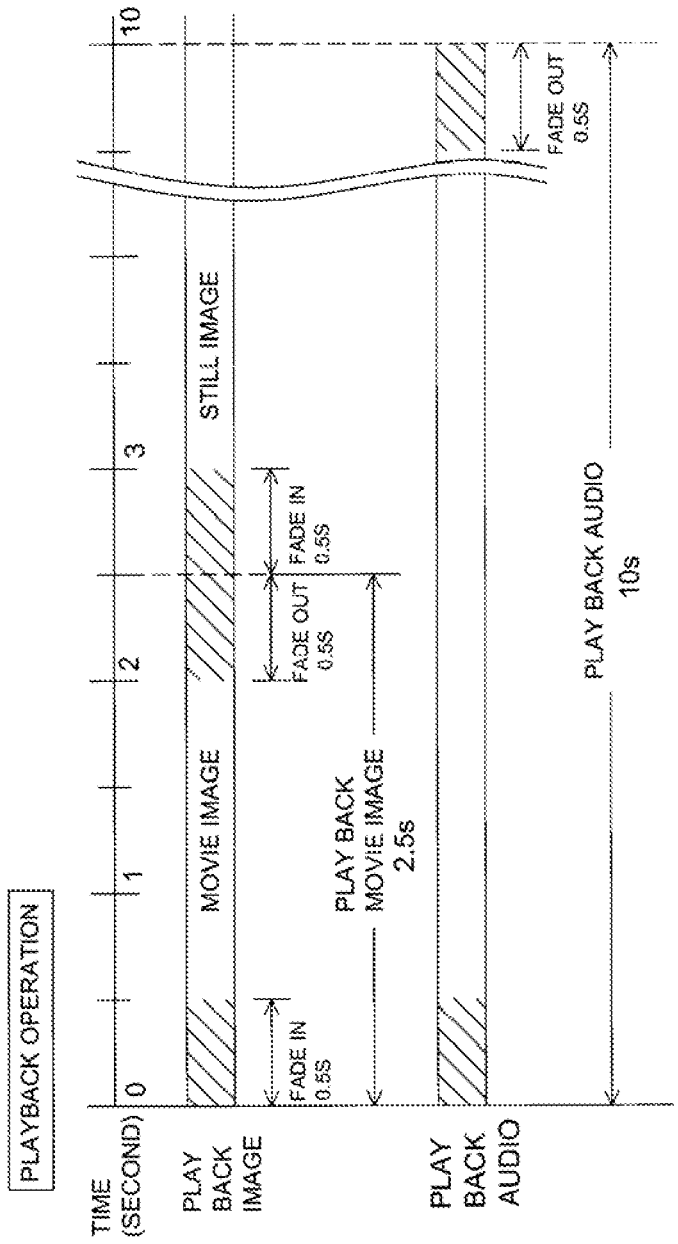

IMAGING DEVICE AND IMAGE-AUDIO PLAYBACK DEVICE

CROSS-REFERENCE TO RELATED APPLICATIONS

The disclosure of the following priority applications is herein incorporated by reference:
Japanese Patent Application No. 2011-19126 filed on Sep. 2, 2011; and
Japanese Patent Application No. 2012-29351 filed on Feb. 14, 2012.

TECHNICAL FIELD

The present invention relates to an imaging device capable of recording movie images, an image-audio playback device capable of playing back movie images, and an imaging device capable of recording movie images and audio.

BACKGROUND ART

A known imaging device simultaneously captures still images while movie images are being captured (for example, see Patent Literature 1). In such an imaging device, when the still images are played back, a specific portion of the audio data acquired by the movie image capturing is extracted, whereby the playback is performed together with the audio.

Further, a known playback device outputs audio in a case where a still image captured while movie images were being captured is played back, by using audio data, of the movie image data corresponding to a predetermined range of time including a point, in time where the still image was captured (for example, see Patent Literature 2). In such a playback device, the audio near the point in time where the still image was captured is issued in a manner like BGM.

CITATION LIST

Patent Literature

{PTL 1} Japanese Unexamined Patent Application Publication No. 2008-283708
{PTL 2} Japanese Unexamined Patent Application Publication No. 2005-117083

SUMMARY OF INVENTION

Technical Problem

However, in the imaging device of Patent Literature 1, the recording duration of the audio and the duration of a specific portion of the extracted audio data are not durations in accordance with the playback duration of the still images, and because the audio of the specific portion undergoes repeat playback or one-time playback processing or the like when the still images are played back, the sense of realism is in some cases adversely affected. On the other hand, there has been a desire to capture movie images and play back the movie images together with audio so as to have an impressive image effect such, as slow-motion movie images, where the subject moves slower than the actual movement.

Patent Literature 2 does not disclose audio recording in a case where slow-motion movie images in which the subject moves slower than the actual movement are captured, and in a case where the technique disclosed in Patent Literature 2 is used, the length of audio recorded for the duration of the slow-root ion movie images to be played back is shorter and therefore it has not been possible to express the atmosphere when the slow-motion movie images were captured.

It is an object of the present invention to provide an imaging device making it possible to record audio data in accordance with the playback time of slew-motion movie images and still images.

It is another object of the present invention to provide an image-audio playback device making it possible to play back audio in accordance with the playback time of slow-motion movie images and still images.

It is yet another object of the present invention to provide an imaging device making it possible to record audio for expressing the atmosphere during capturing together with slow-motion movie images.

Solution to Problem

An imaging device according to the present invention comprises: an imaging sensor that images light from a subject; a storage unit that sequentially stores a plurality of frame images based on an imaging signal from the imaging sensor; a movie image data generation unit feat generates data on slow-motion movie images to be played back at a second frame rate lower than a first frame rate indicative of the number of the frame images stored in the storage unit in a unit of time, on the basis of the plurality of frame images stored in the storage unit in a predetermined duration; a raw audio data recording unit that records raw audio data associated with the slow-motion movie images; an audio data generation unit that generates playback audio data, to be played back during the playback of the slow-motion movie images, on the basis of the raw audio data; an image playback unit that plays back the slow-motion movie images on the basis of the data on the slow-motion movie images; and an audio playback unit that plays back the audio data generated by the audio data generation unit, during the playback of the slow-motion movie images.

An image-audio playback device according to the present invention comprises: an image playback unit that reads out from a storage unit slow-motion movie image data that is movie image data generated on the basis of the plurality of frame image generated based on an imaging signal from an imaging sensor that images subject light and is stored in the storage unit in a unit of time and plays back the slow-motion movie image data; an audio output control unit that controls so that an audio output unit outputs playback audio generated on the basis of raw recorded audio data acquired, from a sound collector that acquires audio, in association with slow-motion movie image data during image playback by the image playback unit.

An imaging device according to the present invention comprises: a storage unit that sequentially stores a plurality of frame images based on an imaging signal from an imaging sensor that images light from a subject, as well as raw recorded audio data based on an audio signal from a sound collector that acquires audio; a movie image data generation unit that generates slow-motion movie image data to be played back at a second, frame rate lower than a first frame rate indicative of the number of frame images stored in the storage unit in a unit of time, on the basis of the plurality of frame images stored in the storage unit during a first predetermined duration; a still image data generation unit that generates at least one set of still image data on the basis of at least one frame image from among the plurality of frame images stored in the storage unit during the first predetermined duration; an audio data generation unit that generates audio data on the basis of the raw recorded audio data stored in the storage unit during a second predetermined duration longer than the first predetermined duration; and a recording control unit that records in a recording medium the audio data generated by the audio data generation unit, in association with the slow-motion movie linage data generated by the movie image data generation unit and the still image data generated by the still image data generation unit.

An image-audio playback device according to the present invention comprises: a storage unit that stores audio data generated, on the basis of raw recorded audio data acquired during a second predetermined duration longer than a first predetermined duration, from a sound collector that acquires audio, in association with slow-motion movie image data relating to slow-motion movie images generated on the basis of a plurality of frame images acquired during the first predetermined duration on the basis of an imaging signal from an imaging sensor that images light from a subject and played back at a second frame rate lower than a first frame rate indicative of the number of frame images generated on the basis of the imaging signal in a unit of time, as well as in association with still image data to be generated on the basis of at least one frame image from among the plurality of frame images; an linage display control unit that controls so that a display unit displays the slow-motion movie images based on the slow-motion movie image data stored in the storage unit and the still image based on the still image data; and an audio output control unit that controls so that an audio output unit outputs audio based on the audio data during the image display control effected by the image display control unit.

An imaging device of the present invention comprises: an imaging sensor that images light from a subject; a storage unit that sequentially stores a plurality of frame images based on an imaging signal from the imaging sensor; a movie image data generation unit that generates data on slow-motion movie images to be played back at a second frame rate lower than a first frame rate indicative of the number of the frame images stored in the storage unit in a unit of time, on the basis of the plurality of frame images stored in the storage unit in a predetermined duration; a raw audio data recording unit that records raw audio data associated with the slow-motion movie images; an audio data generation unit that processes the raw audio data and generates audio data to be played back during the play back of the slow-motion movie images; an image playback unit that plays back the slow-motion movie images on the basis of the data on the slow-motion movie images; and an audio playback unit that plays back the audio data generated by the audio data generation unit, during the playback of the slow-motion movie images.

Advantageous Effects of Invention

Based on the imaging device according to the present invention, it is possible to record audio data in accordance with the playback time of slow-motion movie images and still images.

Based on the image-audio playback device according to the present invention, it is possible to play back audio in accordance with the playback time of slow-motion movie images and still images.

Based on the imaging device according to the present invention, it is possible to record audio for expressing the atmosphere during capturing together with slow-motion movie images.

BRIEF DESCRIPTION OF DRAWINGS

FIG. 12 is a time chart illustrating a playback operation for slow-rot ion movie images, still images, and audio in the electronic camera according to the eighth embodiment.

DESCRIPTION OF EMBODIMENTS

Figure 1:
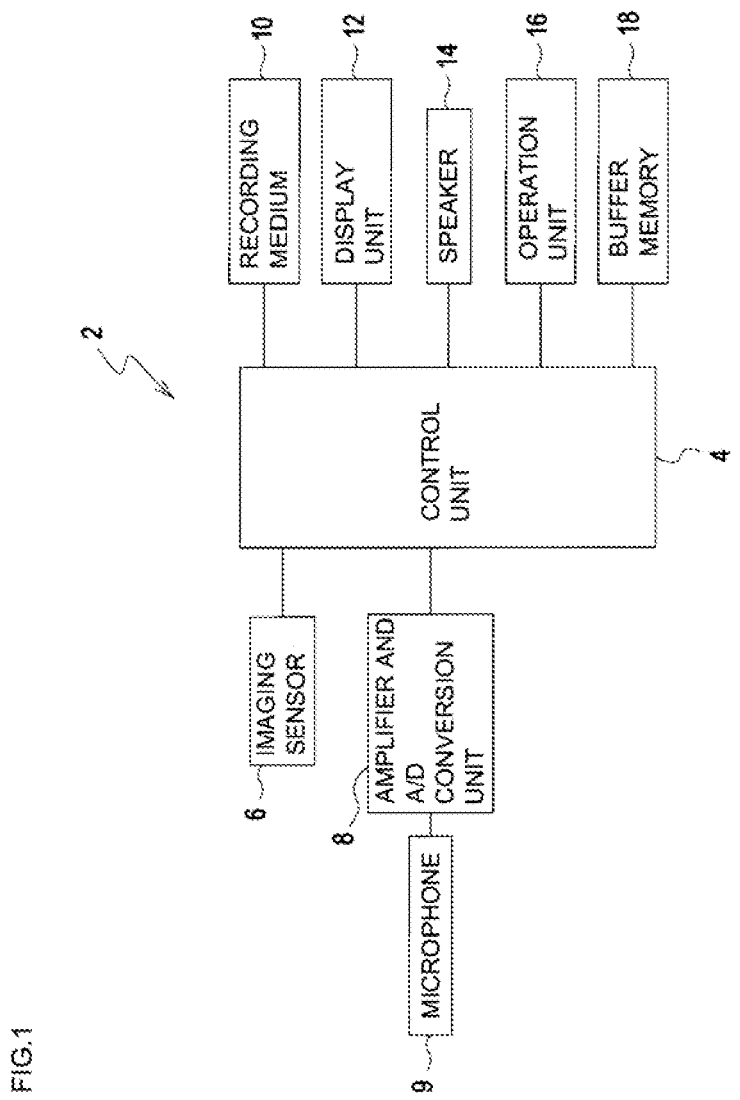
FIG. 1 is a block diagram illustrating a system configuration of an electronic camera according to a first embodiment.

Provided below is a description of an electronic camera serving as an imaging device and an image-audio playback device according to an embodiment of the present invention, with reference to the accompanying drawings. FIG. 1 is a block diagram illustrating a system configuration of the electronic camera according to the embodiment. As illustrated in FIG. 1, an electronic camera 2 is provided with a control unit 4 for overall control of each of the parts of the electronic camera 2, the control unit being constituted of a microprocessor or the like. The control unit 4 is connected to an imaging sensor 6, an amplifier and A/D conversion unit 8, a recording medium 10, a display unit 12, a speaker 14, an operation unit 16, and a buffer memory 18.

The imaging sensor 6 is constituted of a CCD, a CMOS, or the like, and images subject light via an imaging lens (not shown) and outputs an imaging signal to the control unit 4. The control unit 4 converts the imaging signal from the imaging sensor 6 from an analog signal to a digital signal, and creates image data from the digital signal. In the case of a CMOS-type imaging sensor, a digital signal is also directly outputted in some oases.

The amplifier and A/D conversion unit 8 converts an analog signal of audio in the periphery of the electronic camera 2 collected by a microphone 9 into a digital signal and outputs the converted digital signal of audio to the control unit 4. The control unit 4 creates audio data from the digital signal of audio outputted from the amplifier and A/D conversion unit 8. The recording medium 10 is a portable recording medium detachably mounted into a card slot (not shown) provided to the electronic camera 2; for example, a CF card, an SD card, or smart media is used. The recording medium 10 records image data and/or audio data created in the control unit 4.

The display unit 12 is constituted of a monitor constituted of an LCD or the like or of an EVF or the like constituted of an LCD or the like, disposed on a back surface part of the electronic camera 2, and produces a display such as of through images based on the imaging signal from the imaging sensor 6, movie images based on movie image data recorded in the recording medium 10, slow-motion movie image (hereinafter called slow movie images) based on slow-motion movie image data (hereinafter called slow movie image data), still images based on still image data, and information relating to the imaging stored in a memory (not shown) within the electronic camera 2. The speaker 14 outputs audio based on the audio data recorded in the recording medium 10.

The operation unit 16 is configured to comprise a power source switching that turns on or off a power source of the electronic camera 2; a command dial for setting a capturing mode, such as a movie image capturing mode for capturing movie images or a slow-motion movie image capturing mode for capturing slow movie images; a release button that issues a command such as to start capturing movie images or still images or to start recording audio; a menu button that causes the display unit 12 to display a menu or the like; a cross-key to be operated, when menu items or the like are selected or when a variety of settings are made; an OK button for confirming the selection of a menu, item or a variety of settings.

The buffer memory 18 temporarily stores image data generated on the basis of the imaging signal from the imaging sensor 6 as well as raw recorded audio data outputted from the amplifier and A/D conversion unit 8. Herein, in a case where the electronic camera 2 captures slow movie images, the buffer memory 18 sequentially stores a plurality of sets of image data based on the imaging signal outputted from the imaging sensor 6 synchronously with a movie image cycle (60 bps, or the like), i.e., sequentially stores a plurality of frame images constituting slow movie images, in a FIFO (first in, first out) scheme.

With the electronic camera 2 according to the present embodiment, it is possible to generate slow movie image data to be played back at a second frame rate lower than a first frame rate indicative of the number of frame images outputted from the imaging sensor 6 and stored in the buffer memory 18 in a unit of time, as well as to generate still image data based on at least a single frame image from among the plurality of frame images forming the slow movie image data, and to record the generated slow movie image data and still image data in association with each other in the recording medium 10. It is also possible to record, in the recording medium 10, the audio data based on the raw recorded audio data collected by the microphone 9 and generated by the amplifier and A/D conversion unit 8, in association with the slow movie image data, and the still image data.

In the present embodiment, the slow movie image data is generated on the basis of the plurality of frame images stored in the buffer memory 18 from a time when the frame image serving as the still image data was stored in the buffer memory 18 up until prior to a third predetermined duration t3, as well as on the basis of the plurality of frame images stored in the buffer memory 18 from after when the frame image serving as the still image data was stored in the buffer memory 18 until after a fourth predetermined duration t4. In other words, the slow movie image data is generated on the basis of the plurality of frame images stored in the buffer memory 18 during a predetermined duration (the first predetermined duration t1=the third predetermined, duration t3+the fourth predetermined duration t4), and the still, image data is generated on the basis of the frame image stored in the buffer memory 18 upon the completion of the third predetermined duration 11 (when the fourth predetermined duration t4 starts). The first predetermined duration t1 (for example, 1 second, the third predetermined duration t3 (for example. 0.6 seconds), and the fourth predetermined duration t4 (for example, 0.4 seconds) are pre-set and are stored in a memory (not shown) or the like, and are configured so as to be changeable.

In the present embodiment, the audio data is generated on the basis of the audio stored in the buffer memory 18 from a time when the frame image serving as the still image data was stored in the buffer memory 18 up until prior to the third predetermined duration t3, as well as on the basis of the audio stored in the buffer memory 18 from after when the frame image serving as the still image data, was stored in the buffer memory 18 until after a fifth predetermined duration t5. In other words, the audio data is generated on the basis of the audio stored in the buffer memory 18 during a predetermined duration (the second predetermined duration t2=the third predetermined duration t3+the fifth predetermined duration t5). The second predetermined duration t2 (for example, 10 seconds), the third predetermined duration t3 (for example, 0.6 seconds), and the fifth predetermined duration t5 (for example, 9.4 seconds) are pre-set and are stored in a memory (not shown) or the like, and are configured so as to be changeable.

Provided below is a description of processing in a case where slow movie images and still images are captured and audio is recorded in the electronic camera 2 according to the first embodiment, with reference to the accompanying drawings. When a user operates the command dial to thereby set the capturing mode to the slow-motion movie image capturing mode, the control unit 4 moves to the slow-motion movie image capturing mode for capturing slow movie images, capturing still images related to the slow movie images, and recording audio related to the slow movie images. Next, the control unit 4 determines whether or not the release button has been depressed halfway by the user. When the release button has been depressed halfway, the control unit 4 starts preparing to capture the slow movie images and the still images, i.e., focuses on a primary subject and starts capturing slow movie images and recording audio, i.e. starts buffering the frame images and audio into the buffer memory 18, as illustrated in TS1 of FIG. 2 (the point where the release button is depressed halfway).

In the present embodiment, still image data is generated on the basis of the frame images based on the imaging signal outputted from the imaging sensor 6 at a point in time where the user depresses the release button entirely (TS2). As such, in a case where the buffer memory 18 has, for example, a storage region capable of storing n frame images (n being a natural, number), then after n frame images have been stored in the buffer memory 18, processing for deleting the oldest frame image in the buffer memory 18 and storing a generated frame image (the newest frame image) in the buffer memory 18 is repeated every time a frame image is generated until the time when the release button is depressed entirely (TS2).

In a case where the buffer memory 18 has, for example, a storage region capable of storing s hours (s>0) worth of audio, then after s hours worth of audio have been stored in the buffer memory 18, processing for deleting the oldest audio in the buffer memory 18 and storing outputted audio (the newest audio) in the buffer memory 18 in a FIFO scheme is repeated, every time audio is outputted until the time when the release button is depressed entirely (TS2).

Next, the control unit 4 determines whether or not the release button has been depressed entirely in the course of the repetition, of the storage of the frame images and audio into the buffer memory 18. When the release button has been depressed entirely, the control unit 4 determines that a still image capturing command issuing a command for the generation of still image data has been inputted, and the fourth predetermined duration t4 and the fifth predetermined duration t5 are started (the third predetermined duration t3 is terminated).

Figure 2:
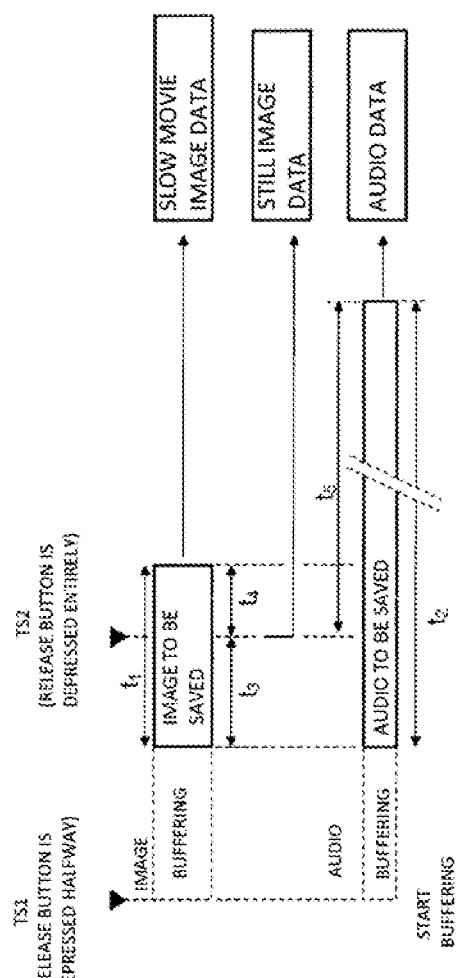
FIG. 2 is a time chart illustrating processing for generating slow-motion movie image data, still image data, and audio data in the electronic camera according to the first embodiment.

Next the control unit 4 determines whether or not the fourth predetermined duration t4 and the fifth predetermined duration t5 have elapsed. In a case where the fourth predetermined duration t4 has elapsed, the control unit 4 terminates the buffering, in the buffer memory 18, of a sufficient number of frame images (the images to be saved, as illustrated in FIG. 2) so as to generate the slow movie image data. In a case where the fifth predetermined duration 15 has elapsed, the control unit 4 terminates the buffering, into the buffering memory 13, of the time worth of audio (audio to be saved, as illustrated in FIG. 2) needed to generate the audio data.

Because the fifth predetermined duration t5 is longer than the fourth predetermined duration t4, the control unit 4 notifies the user that the recording of audio has not been terminated. Herein, the display unit 12 may display an image or text indicating that recording is in progress, whereby the user may be notified that the recording of audio has not been terminated. The display unit 12 may display an indicator or the like indicating the elapsed recording time, whereby the user may be notified that the recording of audio has not been terminated, furthermore, the display unit 12 may display the tire remaining until the termination of recording, whereby the user may be notified, that the recording of audio has not been terminated.

Next, the control unit 4 generates slow movie image data, still image data, and audio data. Firstly, a description of the processing for generating the slow movie image data, shall be provided. The control unit 4, as illustrated in FIG. 2, generates slow movie image data on the basis of the plurality of frame images buffered in the buffer memory 18 from the tire when the release button was depressed entirely until prior to the third predetermined duration t3 (which, in the present embodiment, is 0.6 seconds), as well as on the basis of the plurality of frame images buffered in the buffer memory 18 from the time when the release button was depressed entirely until after the fourth predetermined duration t4 (which, in the present embodiment, is 0.4 seconds). Specifically, frame images stored in the buffer memory 18 at a first frame rate (for example, 60 frames/second) equivalent to a frame rate outputted from the imaging sensor 6 (the imaging frame rate) are read out from the buffer memory t3 at a second frame rate lower than the first frame rate (for example, 24 frames/second, which is 1/2.5 of the first frame rate); the read-out frame images are subjected to resize processing (from a large to small resolution) to a resolution for movie images by a reduction circuit (not shown) within the control unit 4, and to image processing for movie images (including compression processing for movie images) by a movie image signal processing circuit (not shown) within the control unit 4, whereby the slow movie image data is created. The third predetermined duration t3, the fourth predetermined duration t4, and the second frame rate are pre-set and are stored in a memory or the like (not shown), and are configured so as to be changeable.

As illustrated in FIG. 2, the control unit 4 generates still image data on the basis of the frame images based on the imaging signal outputted from the imaging sensor 6, when the release button has been depressed entirely (TS2). Specifically, when the release button has been depressed entirely (TS2), the frame images stored in the buffer memory 18 are read out from the buffer memory 18, and the read-out frame images are subjected to image processing for still images (including compression processing for still images) by a still image signal processing circuit (not shown) within the control unit 4, whereby the still image data is generated.

As illustrated in FIG. 2, the control unit 4 generates audio data on the basis of audio buffered in the buffer memory 18 from the time when the release button was depressed entirely (TS2) until prior to the third predetermined duration t3 (which, in the present embodiment, is 0.6 seconds), as well as on the basis of audio buffered in the buffer memory 18 from the time when the release button was depressed entirely (TS2) until after the fifth predetermined duration t5 (which, in the present embodiment, is 9.4 seconds), i.e., during the second predetermined duration t2 (which, in the present embodiment, is 10 seconds).

Next, the control unit 4 records the generated audio data in the recording medium 10, in association with the slow movie image data and the still image data. Specifically, the slow movie image data, the still image data, acid the audio data are recorded in the recording medium 10 under the same filename.

In addition to or instead of the configuration for giving the sane filename to the slow movie image data, the still image data, and the audio data, the configuration may also be such that audio data information and set ID information are added to the slow movie image data and the still image data, whereby the relationship among the slow movie image data, the still image data, and the audio data can be identified.

In such a case, the audio data information and the set ID information are added into a proprietary information region in a predetermined format together with the slow movie image data and other information, as attachment information of the slow movie image data, and the same is also recorded in the recording medium 10. Similarly, the audio data information and the set ID information are added into the proprietary information region of an APP1 segment (which, in Exif, is a manufacturer note) in a predetermined format such as Exif (Exchangeable image file format), together with compressed data (images) which is still image data and other information, as attachment information of the still image data, and the same is also recorded in the recording medium 10.

Herein, the set ID information is information for associating the slow movie image data and the still image data recorded in the recording medium 10 as different files (files having different extensions); the control unit 4 refers to the set ID information of the slow movie image data (or of the still image data) and therefore identifies the still image data (or the slow movie image data) having the same set ID information as being the still image data associated with the slow movie image data (or as being the slow movie image data associated with the still image data). A filename, numerical value, or the like allocated to the audio data as the audio data information is recorded as attachment information of the slow movie image data and the still image data, and the electronic camera 2 has a database for indicating the filename, numerical value, or the like of the audio data, within, for example, a memory (not shown).

Figure 3:
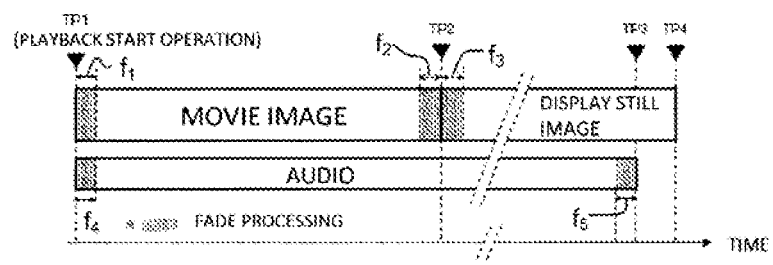
FIG. 3 is a time chart illustrating processing for playing back slow-motion movie images, still images, and audio in the electronic camera according to the first embodiment.

Processing for when the slow movie images and still images are to be played back in the electronic camera 2 according to the first embodiment shall now be described, with reference to the time chart illustrated in FIG. 3. Firstly, when the user operates the command dial to set the playback node, the control unit 4 moves to the playback mode for playing back the slow movie images based on the slow movie image data, the still images based on the still image data, and the audio based on the audio data, as recorded in the recording medium 10. The question of whether or not the user has issued a command to play back slow movie images via the operation unit 16 is determined. Herein, examples of the command to play back the slow movie images include, depressing a frame advance button (not shown), a left button of the cross-key for issuing a command to display the next image, or a right button of the cross-key for issuing a command to display the previous image, in a case where the display unit 12 is displaying the slow movie images or the still images; or depressing an OK button after using the cross-key to select a thumbnail image of the slow movie images, in a case where, for example, a list of thumbnail images of the image data recorded in the recording medium 10 is being displayed on the display unit 12 in order from oldest to newest image-capturing data or vice versa, or a similar display is produced.

In a case where a command to play back the slow movie images has been issued, the control unit 4 buffers in the buffer memory 18 the slow movie image data of the slow movie images for which the playback command is issued, as weld as the still image data and the audio data recorded in the recording medium 10 in association with the slow movie image data.

Next, the control unit 4, in order to give the impression that the slow movie images are played back, causes the display unit 12 to display, for a snort duration f1 (about 0.5 seconds), a black image between an image having been displayed on the display unit 12 and the first of the frame images forming the slow movie images. In other words, after the display screen of the display unit 12 is momentarily blacked out, the slow movie images buffered in the buffer memory 18 start to be played, back. Specifically, the display unit 12 displays in time series, at the second frame rate lower than the first frame rate (the imaging frame rate), the plurality of frame images captured during the third, predetermined duration t3 as well as the plurality of frame images captured during the fourth predetermined duration t4; at the same time, the audio is played back, as shall be described below. At such a time, a transition effect, such as where the slow movie images fade in, is executed from the start of the playback of the slow movie images over a predetermined duration f1 (about 0.5 seconds).

The control unit 4, in order to give the impression that the slow movie images are played back, causes the speaker 14 to output, for a short duration, audio with a reduced volume between the audio having already been outputted from the speaker 14 and the audio to be played back together with the slow movie images. Alternatively, the control unit 4 discontinues, for a short duration, the output of the audio from the speaker 14. In other words, after the audio being outputted from the speaker 14 is momentarily muted, the audio buffered in the buffer memory 18 starts to be played back. Specifically, the audio collected during the third predetermined duration and the audio collected during the fifth predetermined duration are played back simultaneously with the slow movie images. At such a time, processing for the audio, such, as where the audio fades in, is executed from the start of the playback of the audio over a predetermined duration f4 (about 0.5 seconds). In FIG. 3, the duration f1 where the transition effect is executed, on the slow movie images after the start of playback has the same length as the duration f4 where the processing for the audio is executed, but the lengths may also be different.

The control unit 4 continues the playback of the slow movie images and the audio, and executes a transition effect such as where the slow movie images fade out from a predetermined duration f2 (about 0.5 seconds) prior to the termination of the playback of the slow movie images (TP2) until the termination of the playback of the slow movie images (TP2). In a case where the control unit 4 determines that the playback of the slow movie images has been terminated, the display unit 12 displays a still image buffered in the buffer memory 18 after 2.5 seconds have elapsed since the start of playback of the slow movie images in a case where, for example, the third predetermined duration t3 is 0.6 seconds, the fourth predetermined duration t4 is 0.4 seconds, and the second frame rate is 1/2.5 of the first frame rate. At such a time, a transition effect such as where the still images fade in is executed after the start of playback of the still images (TP2) over a predetermined duration f3 (about 0.5 seconds).

The playback of audio continues until the playback of all audio that has been buffered in the buffer memory 18 has been terminated. In other words, the control unit 4 continues the playback of audio irrespective of the whether the playback of the slow movie images has been terminated or whether the playback of the still images has begun, and processing such as where the audio fades out is executed on the audio from a predetermined duration f5 (about 0.5 seconds) prior to the termination of playback of the audio (TP3) until the termination of the playback of audio. In the present embodiment, because the playback duration of the audio based on the audio data is the second predetermined duration t2, TP3 is a time when the second predetermined duration t2 has elapsed since TP1.

Next, the control unit 4 determines whether or not the user has issued a command to discontinue the display of the still images via the operation unit 16. Examples of commands to discontinue the display of the still images include depressing, while the still images are being displayed, the OK button that issues a command to re-display the slow movie images, the left button of the cross-key for issuing a command to display the next image, or the right button of the cross-key for issuing a command to display the previous image. In a case where a command to discontinue the display of the still images has been issued, the control unit 4 discontinues the display of the still images as illustrated by the point of time TP4 in FIG. 5.

Based on the electronic camera, according to the first embodiment, it is possible to record and play back audio data in accordance with the playback time of slow-motion movie images and still images.

Figure 4:
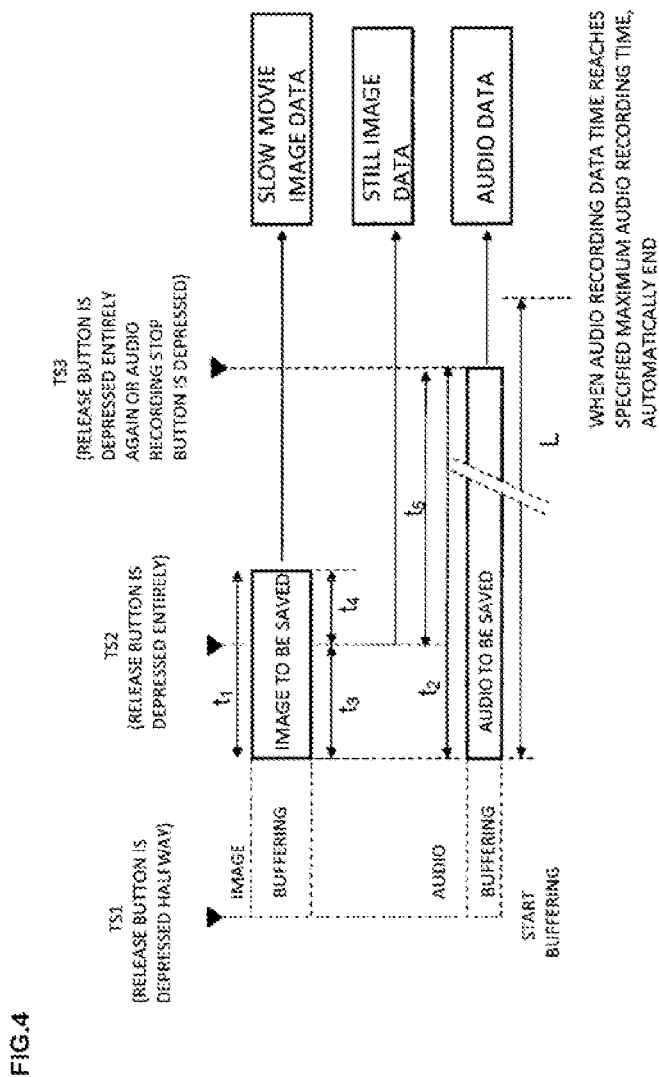
FIG. 4 is a time chart illustrating processing for generating slow-motion movie image data, still image data, and audio data in an electronic camera according to a second embodiment.

Next processing in a case where slow movie images and still images are captured and audio is recorded in an electronic camera 2 according to a second embodiment shall now be described, with reference to FIG. 4.

When the user operates the command dial to thereby set the capturing mode to the slow-motion movie image capturing mode, the control unit 4 moves to the slow-motion movie image capturing mode. Next, the control unit 4 determines whether or not the release button has been depressed halfway by the user. When the release button has been depressed halfway, the control unit 4 starts buffering of frame images and audio in the buffer memory 18, as illustrated by TS1 in FIG. 4 (the point in time where the release button is depressed halfway). The buffering processing herein is the same as the buffering processing in the first embodiment, and therefore a description has been omitted.

Next, the control unit 4 determines whether or not the release button has been depressed entirely while the storage of the frame images and audio into the buffer memory 18 is being repeated. When the release button has been depressed entirely, the control unit 4 determines that a still image capturing command issuing a command for the generation of still image data has been inputted, and the fourth predetermined duration t4 and the fifth predetermined duration t5 are started (the third predetermined duration t3 is terminated).

Next, the control unit 4 determines whether or not the fourth predetermined duration t4 has elapsed from when the release button was depressed entirely (TS2). In a case where the fourth predetermined duration t4 has elapsed, the control unit 4 terminates the buffering, in the buffer memory 18, of a sufficient number of frame images (the images to be saved, as illustrated in FIG. 4) so as to create the slow movie image data.

Next, the control unit 4 determines whether or not the user has again depressed the release button entirely after the fourth predetermined duration t4 has elapsed since TS2. In a case where the release button has been depressed entirely, the control unit 4 determines that a command to terminate audio recording has been inputted, and terminates the fifth predetermined duration t5. In other words, the buffering into the buffer memory 18 of the time worth of audio (the audio to be saved as illustrated in FIG. 4) needed to generate the audio data is terminated at the point in time TS3. In a case where a specified maximum audio recording duration L (for example, 10 seconds), which is the maximum length of audio data that can be generated, has elapsed before the release button is depressed entirely, the control unit 4 terminates the fifth predetermined duration t5. In a case where the operation unit 16 is provided with an audio recording stop button that issues a command to terminate audio recording, the control unit 4 may be configured to terminate the fifth predetermined duration t5 whenever the audio recording stop button has been depressed.

Next, the control unit 4 generates slow movie image data, still image data, and audio data, and records the generated audio data in the recording medium 10 in association with the slow movie image data and the still image data. The processing for generating the data and the processing for recording the data are the same as the processing in the first embodiment, and therefore a description thereof has been omitted.

In the electronic camera 2 according to the second embodiment, the processing for playing back the slow movie images and the still images is the same as the playback processing in the electronic camera 2 according to the first embodiment, and therefore a description thereof has been omitted.

Based on the electronic camera according to the second embodiment, it is possible to record audio related to slow movie images and still images until all audio required by a user has been entirely recorded.

In the second embodiment, the description relates to a configuration for playing back audio; having a longer playback time than the playback time of the slow movie images, but in a case where the playback time of the audio is of the same length of the playback time for the slow movie images, the audio is played back once at the same time as the slow movie images, and thereafter the audio is played back once more when the still images are played back. In such a case, the control unit 4 plays back the still, images to match the playback time of the audio.

In the second embodiment, when the release button has been depressed entirely, the configuration is such that the control unit 4 determines that a command to terminate audio recording has been inputted, but in a case where the operation unit 16 of the electronic camera 2 is provided with an audio recording button that issues a command to record audio, the configuration may be such that the control unit 4 records audio while the audio recording button is being depressed. In other words, in a case where the audio recording button is depressed when the release button has been depressed entirely, then the control unit 4 starts the fourth predetermined duration t4 and the fifth predetermined duration t5 (termi-nates the third predetermined duration t3), and terminates the fifth predetermined duration t5 when the audio recording button is no longer being depressed. In other words, the duration when the audio recording button is being depressed serves as the fifth predetermined duration t5 for acquiring audio. In such a case, disposing the audio recording button in the vicinity of the release button makes it possible to adopt a configuration allowing the user to, for example, operate the release button with the forefinger and operate the audio recording button with the thumb. As such, a simple operation makes it possible to record audio desired by the user.

Further, in such a case, the configuration is such that no audio is recorded in a case where the audio recording button is not depressed when the release button has been depressed entirely. At such a time, the control unit 4 uses a BGM stored in a memory (not shown) as audio to be outputted from the speaker 14 when playing back slow movie images based on the slow movie image data generated on the basis of the plurality of frame images buffered in the buffer memory 18, and still images based on the still image data generated on the basis of the frame images based on the imaging signal outputted from the imaging sensor 6 when the release button was depressed entirely. In a case where a plurality of BGMs have been stored in the memory (not shown), a configuration may be adopted for the user to select a theme BGM in accordance with the slow movie images and the still images.

In such a case, in a case where the release button is depressed halfway and the audio recording button is depressed, a configuration may be adopted where the second predetermined duration t2 is started, and where the second predetermined duration t2 is then terminated in a case where thereafter the audio recording button is no longer being depressed.

Figure 5:
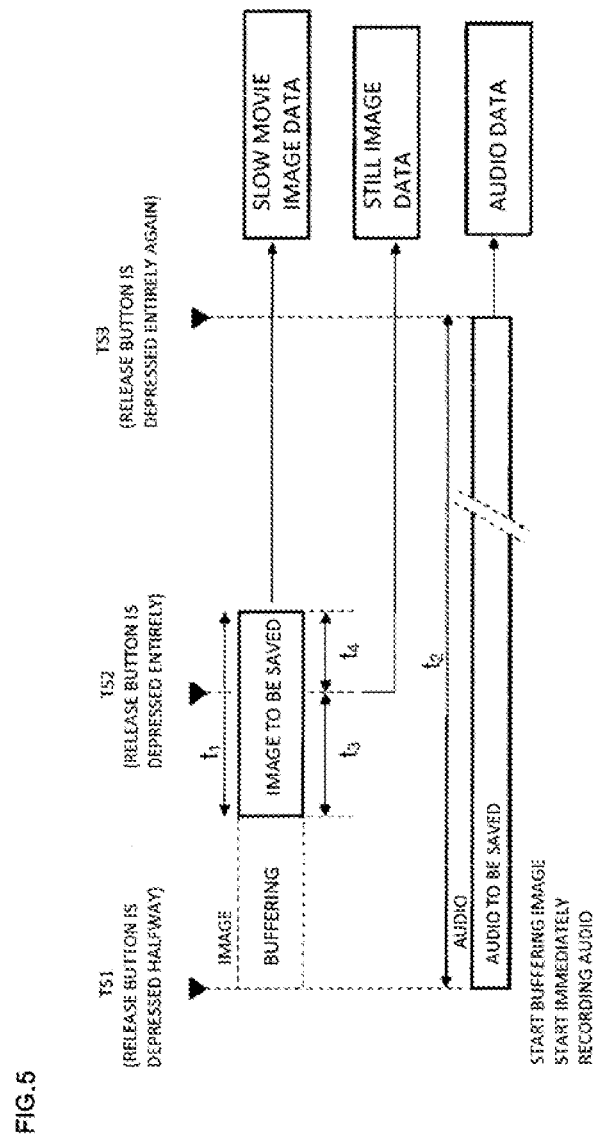
FIG. 5 is a time chart illustrating processing for generating slow-motion movie image data, still image data, and audio data in an electronic camera according to a third embodiment.
Figure 6:
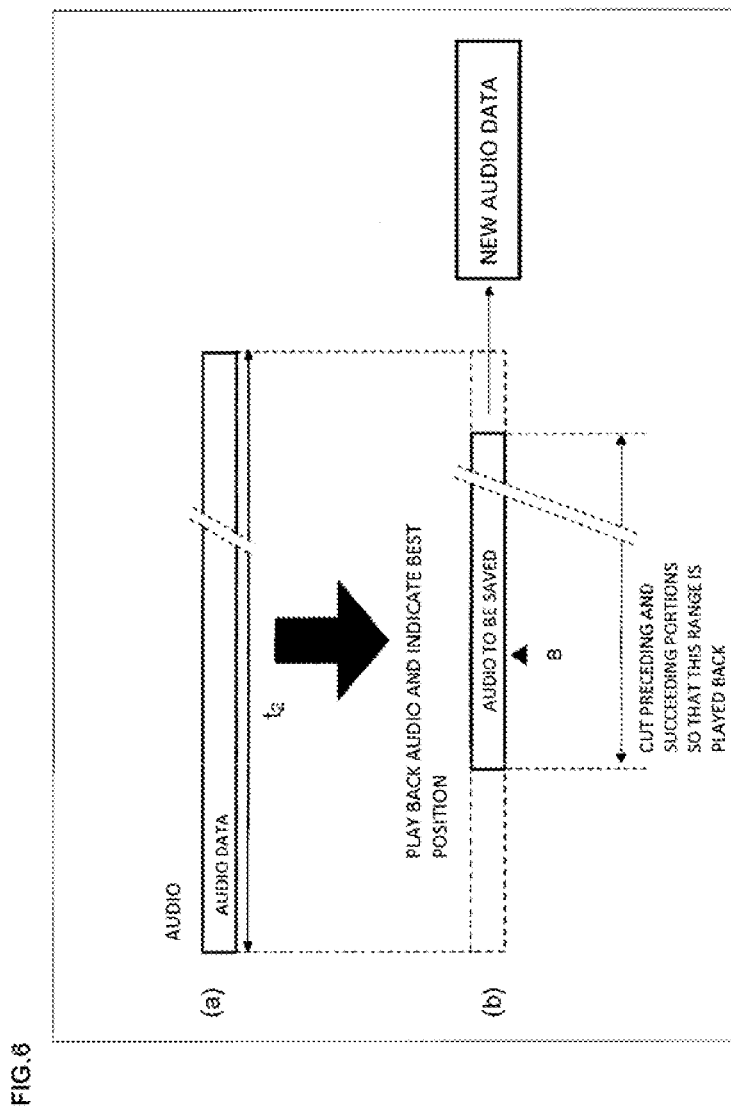
FIG. 6 is a diagram illustrating processing for recording audio data in the electronic camera according to the third embodiment.

Next, processing for a case where slow movie images and still images are captured and audio is recorded in an electronic camera 2 according to a third embodiment shall now be described, with reference to FIGS. 5 and 6.

When the user operates the command dial to thereby set the capturing mode to the slow-motion movie image capturing mode, the control unit 4 moves to the slow-motion movie image capturing mode. Next, the control unit 4 determines whether or not the release button has been depressed halfway by the user. When the release button is depressed halfway, the control unit 4, as illustrated by TS1 (the point in time when the release button is depressed halfway) in FIG. 5, prepares to capture slow movie images and still images, i.e., focuses on the primary subject, and starts capturing slow movie images, i.e., starts buffering frame images into the buffer memory 18. At such a time, the control unit 4 starts the second predetermined duration t2, and starts buffering audio into the buffer memory 18.

Herein, in the third embodiment, the frame images are stored sequentially in the buffer memory 18 in a FIFO scheme, similarly to the first embodiment. However, audio that is stored in the buffer memory 18 from the time when the release button has been depressed halfway by the user until when the second predetermined duration t2 (the fifth predetermined duration t5) is terminated, rather than being deleted, is instead stored in the buffer memory 18.

Next, the control unit 4 determines whether or not the release button has been depressed entirely while the storage of the frame images in the buffer memory 18 was being repeated. In a case where the release button has been depressed entirely, the control unit 4 determines that a command to capture still images, issuing a command to generate still image data, has been inputted, and starts the fourth predetermined duration t4 (terminates the third predetermined duration t3).

Next, the control unit 4 determines whether or not the fourth predetermined duration t4 has elapsed, from when the release button was depressed entirely (TS2). In a case where the fourth predetermined duration t4 has elapsed, the control unit 4 terminates the buffering, into the buffer memory 18, of a sufficient member of frame images (the images to be saved illustrated in FIG. 5) so as to create slow movie image data.

Next, the control unit 4 determines whether or not the user has again depressed the release button entirely after the fourth predetermined duration t4 has elapsed. In a case where the release button has been depressed entirely (TS3), the control unit 4 determines that a command to terminate audio recording has been inputted, and terminates the second predetermined duration t2 (the fifth predetermined duration t5) and terminates the buffering of audio (audio to be saved illustrated in FIG. 5) into the buffer memory 18. In a case where, prior to when the release button is depressed entirely, a specified maximum audio recording duration (for example, 20 to 30 seconds), which is the maximum length of audio data that can be generated, has elapsed, then the control unit 4 terminates the second predetermined duration t2 (the fifth predetermined duration t5). In a case where the operation unit 16 is provided with an audio recording step button that issues a command to terminate audio recording, when the audio recording stop button has been depressed, the control unit 4 may be configured to terminate the second predetermined duration t2 (the fifth predetermined duration t5).

Next, the control unit 4 generates slow movie image data, still image data, and audio data. Herein, the processing for generating the slow movie image data and the still image data is the same as the processing in the first embodiment, and therefore a description thereof has been omitted.

The control unit 4 generates audio data on the basis of audio buffered in the buffer memory 18 from when the release button was depressed halfway (TS1) during the second predetermined duration t2.

Next, the control unit 4 records the generated audio data in the recording medium 10 in association with the slow movie image data and the still image data. The recording processing herein is the same as the processing in the first embodiment and therefore a description thereof has been omitted.

Next, as illustrated in FIG. 6(a), the control unit 4 plays back audio based on the generated audio data. In other words, audio is outputted from the speaker 14. The control, unit 14 determines whether or not the user has depressed the OK button or performed a similar operation while the audio is being played back. In a case where the OK button has been depressed or a similar operation has been performed, the control unit 4 determines that a best position for the audio being played back has been indicated, and, as illustrated by the solid lines in FIG. 6(b), new audio data of a shorter predetermined length (which, in the present embodiment, is 10 seconds) than the second predetermined duration t2, including the best position B, is generated from the audio data of the audio presently being played back. Herein, the audio data of the portion illustrated by the dotted line in FIG. 6(b) is deleted. When the generated audio is being played back, the control unit 4 may also play back slow movie images based on the generated slow movie image data and still images based on the generated still image data. In other words, slow movie images and still images may be outputted to the display unit 12.

Next, the control unit 4 records the new audio data in the recording medium 10, instead of the audio data of the audio that was played back. In other words, the new audio data is saved in an overwriting manner, and the new audio data is recorded in association with the slow movie image data and the still image data.

In a case where the user has depressed the OK button multiple times while the audio is being played back, the control unit 4 generates audio data of a predetermined length including each of the plurality of best positions, and generates new audio data in conjunction with the plurality of audio data sets. For example, in a case where the OK button has been depressed twice, 5-second audio data sets including each of the two best positions are generated, and new audio data is generated in conjunction with the two audio data sets. In a case where the OK button has been depressed three times, 3.3-second audio data sets including each of the three best positions are generated, and new audio data is generated in conjunction with the three audio data sets. When the new audio data is generated in conjunction with the plurality of audio data sets, cross-fading or similar processing is performed at the conjunction of the audio data sets.

Based on the electronic camera according to the third embodiment, it is possible for the user to indicate audio data to be associated with the slow movie image data and the still image data, and therefore it is possible to more accurately record desired audio data in the recording medium.

In the third embodiment, the configuration is such that new audio data, is generated and saved in the recording medium 10 in an overwriting manner, but a separate file for audio data may also be generated without overwriting being performed. In such a case, in order to associate the slow movie image data and the still image data with the new audio data, the control unit 4 creates a copy of the slow movie image data and the still image data and stores the copy in the buffer memory 18. Next, the control unit 4 records in the recording medium 10 the new audio data together with the slow movie image data and still image data created under the copy, under a new, identical filename. As such, a plurality of files in which different audio has been associated with one slow movie image and one still image can be created.

In the third embodiment, the configuration is such that the best position is indicated while the audio is being played back, but the configuration may also be such that the display unit 12 displays an indicator while the audio is being played back. The indicator displays a bar indicative of the playback position of the audio and a pointer indicative of the point in time when the command to capture still images was inputted. In such a case, the user is able to indicate the best position while also visually confirming the approximate playback position.

In the third embodiment, in a case where a plurality of best positions are indicated, the audio played back simultaneously with the playback of the slow movie images and the audio played back simultaneously with the playback of the still images may be indicated separately. For example, in a case where two best positions are indicated, it is possible to indicate 2.5 seconds of audio played back simultaneously with the playback of the slow movie images and 7.5 seconds of audio played back simultaneously with the playback of the still images.

Processing of a case where slow movie images and still images are captured and audio is recorded in an electronic camera 2 according to a fourth embodiment shall now be described, with reference to FIG. 7. Together with the time chart illustrated in FIG. 7(a), FIG. 7(b) illustrates a graph representing the audio level of audio collected by the microphone 9.

When the user operates the command dial to thereby set the capturing mode to the slow-motion movie image capturing mode, the control unit 4 moves to the slow-motion movie image capturing mode. Next, the control unit 4 determines whether or not the release button has been depressed halfway by the user. When the release button has been depressed halfway, the control unit 4 starts buffering frame images and audio in the buffer memory 18, as illustrated by TS1 (the point in time when the release button is depressed halfway) in FIG. 7. The buffering processing herein is the same as the buffering processing in the first embodiment, and therefore a description has been omitted.

Next, the control unit 4 detects the audio level of the audio acquired via the microphone 9, and determines whether or not the audio level has reached or exceeded a threshold V1 while the frame images and audio are being repeatedly stored into the buffer memory 18. As per the point in time illustrated by TS2 in FIG. 7, in a case where the audio level has reached or exceeded the threshold V1, then the control unit 4 determines that a command to capture still images issuing a command to generate still image data has been inputted, and starts the fourth predetermined duration t4 and the fifth predetermined duration to (terminates the third predetermined duration t3). FIG. 7(*b*) illustrates, as an image diagram, an example where the audio level reaches and exceeds the threshold V1 and reaches a peak at the point in time illustrated by TS2, due to the whistling of a train.

Next, the control unit 4 determines whether or not the fourth predetermined duration t4 has elapsed since the point in time (TS2) where the audio level reached and exceeded the threshold V1. In a case where the fourth predetermined duration t4 has elapsed, toe control unit 4 terminates the buffering, into the buffer memory 18, of a sufficient number of frame images (the images to be saved illustrated in FIG. 7(*a*)) so as to create the slow movie image data.

next, the control unit 4 determines whether or not the audio level has become smaller than the threshold V2 since the fourth predetermined duration t4 elapsed. In a case where the audio level has become smaller than the threshold V1, then the control unit 4 determines that a command to terminate audio recording has been inputted, and terminates the fifth predetermined duration t5, and terminates the buffering, into the buffer memory 18, of the audio (the audio to be saved illustrated in FIG. 7(*a*)) needed in order to generate the audio data. In a case where a specified maximum audio recording duration (for example, 10 seconds), which is the maximum length of audio data that can be generated, has elapsed prior to when the audio level has become smaller than the threshold where audio recording should be terminated, then the control unit 4 terminates the fifth predetermined duration t5.

Next, the control unit 4 generates slow movie image data, still image data, and audio data. Firstly, a description of the generation of the slow movie image data shall be provided. The control unit 4 generates slow movie image data on the basis of the plurality of frame images buffered in the buffer memory 18 from when the audio level, reached or exceeded the threshold V1 until prior to the third predetermined duration t3 (which, in the present embodiment, is 0.6 seconds), and on the basis of the plurality of frame images buffered in the buffer memory 18 from when the audio level reached or exceeded the threshold V1 until after the fourth predetermined duration t4 (which, in the present embodiment, is 0.4 seconds). Specifically, processing to change the frame rate or to resize is performed and the slow movie image data is generated, similarly to the first embodiment.

Figure 7:
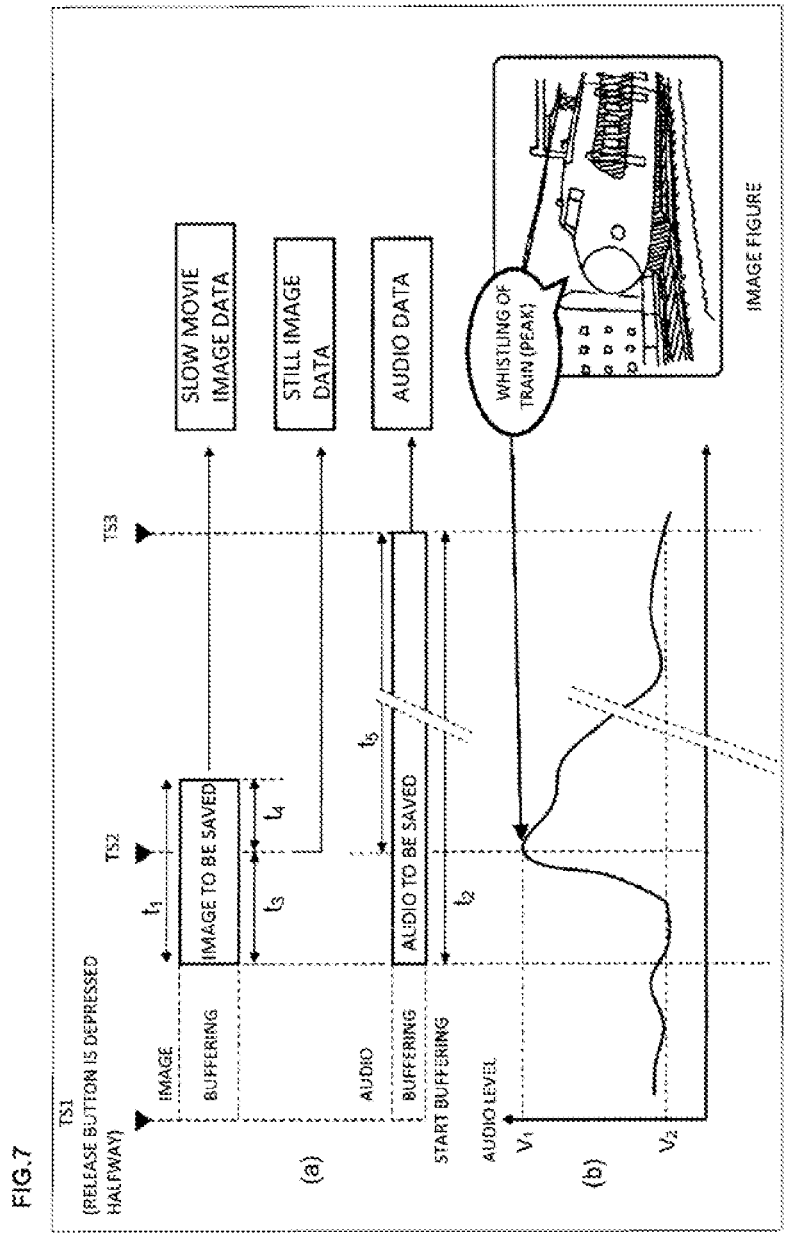
FIG. 7 is a time chart illustrating processing for generating slow-motion movie image data, still image data, and audio data in an electronic camera according to a fourth embodiment.

As illustrated in FIG. 7, the control unit 4 generates still, image data on the basis of the frame image based on the imaging signal outputted from the imaging sensor 6 when the audio level reaches the threshold V1. Specifically, image processing for still images is executed similarly to the first embodiment, whereby the still image data is generated. The still image data may also be generated on the basis of the frame image based on the imaging signal outputted from the imaging sensor 6 when the audio level reaches a peak. In such a case, the still image data when the audio level readies the peak may foe generated in addition to the still image data generated when the audio level reaches the threshold V1; or, the still image data when the audio level, reaches the peak may be generated instead of the still image data generated when the audio level reaches the threshold V1.

As illustrated in FIG. 7, the control unit 4 generates audio data on the basis of audio buffered in the buffer memory 18 from when the audio level reached the threshold V1 until, prior to the third predetermined duration t3 (which, in the present embodiment, is 0.6 seconds), and on the basis of the audio buffered in the buffer memory 18 from when the audio level reached the threshold V1 until after the fifth predetermined duration t5, i.e., during the second predetermined duration t2.

Next, the control unit 4 records the generated slow movie image data, the still image data, and the audio data in the recording medium 10 in association with each other. The processing for recording in the recording medium 10 is the same as the processing in the first embodiment, and therefore a description thereof has been omitted.

Based on the electronic camera according to the fourth embodiment, because images can be captured and audio can be recorded upon clapping, cheering, or other timings where the sound level rises, slow movie image data, still image data, and audio data can be recorded at a timing desired by the user, at a party or the like.

In the fourth embodiment, when the audio level readies or exceeds the threshold V1, the control unit 4 is configured so as to determine that a command to capture still images, issuing a command to generate still image data, has been inputted, and to start the fourth predetermined duration t4 and the fifth predetermined duration t5 (to terminate the third predetermined duration t3); however, the configuration may be such that the timing for starting the fourth predetermined duration t4 and for starting the fifth predetermined duration t5 is different. In other words, the configuration nay be such that when the user has depressed the release button entirely, the fourth predetermined duration t4 is started (the third predetermined duration t3 is terminated with respect to the buffering of the frame images), and when the audio level reaches or exceeds the threshold V1, then the fifth predetermined duration t5 is started (the third predetermined duration t3 is terminated with respect to the buffering of the audio).

In such a case, the control unit 4 generates slow movie image data on the basis of the plurality of frame images buffered in the buffer memory 18 from when the release button was depressed entirely until prior to the third predetermined duration t3 and on the basis of the plurality of frame images buffered in the buffer memory 18 from when the release button was depressed entirely until after the fourth predetermined duration t4; the control unit 4 also generates still image data on the basis of the fraise image based on the imaging signal outputted from the imaging sensor 6 when the release button was depressed entirely. Further, the control unit 4 generates audio data on the basis of audio buffered in the buffer memory 13 from when the audio level reached and exceeded the threshold V1 until, prior to the third predetermined duration t3, and on the basis of the audio buffered in the buffer memory 18 from when the audio level reached and exceeded the threshold V1 until after the fifth predetermined duration t5.

In each of the embodiments described above, in a case where the release button has been depressed entirely, or in a case where the audio level has reached and exceeded the threshold V1, the configuration has been such that the control unit 4 determines that a command to generate still images has been inputted, but the configuration may also be such that the control unit 4 recognizes a smile or performs some other form of facial recognition on the basis of the frame image and, for example, upon recognizing a smile, determines that a command, to generate a still image has been inputted, and starts the fourth predetermined duration t4 (terminates the third predetermined duration t3 with respect to the buffering of the frame images).

Also in the fourth embodiment, the configuration is such that when the release button is depressed halfway, the control unit 4 starts buffering the frame image data and audio data into the buffer memory 18, but the configuration may also be such that when, during the slow-motion movie image capturing mode, the menu button, the OK button or the like is operated to thereby set a party mode adapted for capturing images during party scenes and the like, then the control unit 4 starts buffering the frame image data and the audio data into the buffer memory 18.

Next processing in a case where slow movie images and still images are captured and audio is recorded in an electronic camera 2 according to a fifth embodiment shall now be described, with reference to FIG. 8. To facilitate understanding, together with the time chart illustrated in FIG. 8(*a*), FIG. 8(*b*) illustrates a frame image based on the imaging signal outputted from the imaging sensor 6.

When the user operates the command dial to thereby set the capturing mode to the slow-motion movie image capturing mode, the control unit 4 moves to the slow-motion movie image capturing mode. Next, the control unit 4 determines whether or not the release button has been depressed halfway by the user. When the release button is depressed halfway, the control unit 4 starts buffering frame images and audio into the buffer memory 18, as illustrated by TS1 (the point in time where the release button is depressed halfway) in FIG. 8. The buffering processing herein is the same as the buffering processing in the first embodiment, and therefore a description has been omitted.

Next, the control unit 4 determines whether or not there is motion in the subject within the frame images, on the basis of the differences found by analyzing the plurality of frame images based on the imaging signal outputted from the imaging sensor 6. In a case where, as illustrated by (ii) in FIG. 8(*b*), there has been movement in the subject at the point in time TS4, then the control unit 4 determines that a command to start recording audio, issuing a command to generate audio data, has been inputted, and starts the second predetermined duration t2.

Next, the control unit 4 determines whether or not the release button has been depressed entirely while the storage of the frame images and audio into the buffer memory 18 is being repeated. When the release button has been depressed entirely, the control unit 4 determines that a still image capturing command issuing a command for the generation of still image data has been inputted, and starts the fourth predetermined duration t4 (terminates the third predetermined duration t3).

Next, the control unit 4 determines whether or not the fourth predetermined duration t4 has elapsed from when the release button was depressed, entirely (TS2). In a case where the fourth predetermined duration t4 has elapsed, the control unit 4 terminates the buffering, into the buffer memory 18, of a sufficient number of frame images (the images to be saved illustrated in FIG. 8(*a*)) so as to create the slow movie image data.

Figure 8:
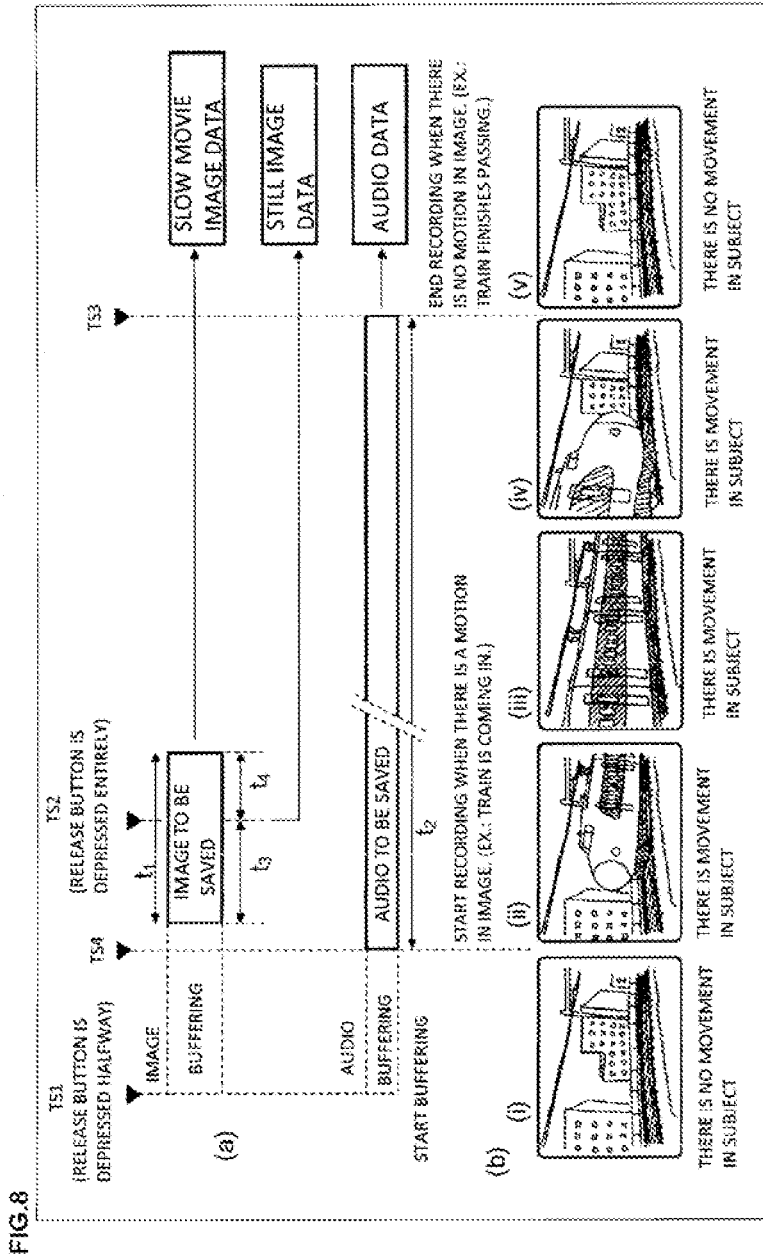
FIG. 8 is a time chart illustrating processing for generating slow-motion movie image data, still image data, and audio data in an electronic camera according to a fifth embodiment.

Next, the control unit 4 determines whether or not the movement in the subject in the frame image has stopped, on the basis of the difference found by analyzing the plurality of frame images ((iii) to (v) in FIG. 8(*b*), and the like) based on the imaging signal outputted from the imaging sensor 6. In a case where, for example, as illustrated in (v) of FIG. 8(*b*), the movement in the subject in the frame image has stopped, the control unit 4 determines that a command to terminate audio recording has been inputted, and terminates the second predetermined duration t2. In other words, the buffering of audio (the audio to be saved illustrated in FIG. 8(*a*)) into the buffer memory 18 is terminated.

Next, the control unit 4 generates slow movie image data, still image data, and audio data, and records the generated audio data in the recording medium 10 in association with the slow movie image data and the still image data. The processing for generating the data and the processing for recording the data are the same as the processing in the first embodiment, and therefore a description thereof has been omitted.

Based on the electronic camera according to the fifth embodiment, it is possible to record audio while the subject is moving, in association with the slow movie images and the still images.

In the fifth, embodiment, in a case where the length of audio based on the audio data recorded in the recording medium 10 is longer than the playback time of the slow movie images and the still images, then the processing for indicating the best position in the third embodiment may be perforated to thereby generate new audio data and to record the new audio data in the recording medium 10. In such a case, processing to adjust the display time of the still images in the seventh embodiment (described below) may also be performed.

Next processing in a case where slow movie images and still images are captured and audio is recorded in an electronic camera 2 according to a sixth embodiment shall now be described, with reference to the accompanying drawings.

When the user operates the command dial to thereby set the capturing mode to the slow-motion movie image capturing mode, the control unit 4 moves to the slow-motion movie image capturing mode. Next, the control unit 4 determines whether or not the release button has been depressed halfway by the user. When the release button is depressed halfway, the control unit 4 starts buffering frame images and audio into the buffer memory 18, similarly to the processing performed in the first embodiment (see FIG. 2) when the release button is depressed halfway.

Next, when the release button is depressed entirely, the control unit 4 performs the same processing as in the first embodiment. In other words, the fourth, predetermined duration t4 and the fifth predetermined duration t5 are started (the third predetermined duration t3 is terminated), and after the fourth predetermined duration t4 has elapsed, the buffering, into the buffer memory 18, of a sufficient number of frame images so as to generate the slow movie image data is terminated. Also, after the fifth predetermined duration t5 has elapsed, the buffering, into the buffer memory 18, of the time worth of audio needed to generate the audio data is terminated.

Next, the control unit 4 generates slow movie image data and still image data similarly to the processing in the first embodiment. The control unit 4 also analyzes tire time worth of audio needed to generate the audio data buffered in the buffer memory 18, and determines whether or not the audio has a predetermined period. When it is determined that the audio has the predetermined period, the control unit 4 generates the predetermined period worth of audio data (at least worth one period).

Next, the control unit 4 records the generated audio data in the recording medium 10 in association with the slow movie image data and the still image data, similarly to the processing in the first embodiment.

Processing for when slow movie images and still images are played back in the electronic camera 2 according to the sixth embodiment shall now be described.

Firstly, when the user operates the command dial and sets the playback mode, the control unit 4 moves to the playback mode, similarly to the first embodiment. The control unit 4 then determines whether or not the user has issued a command to play back the slow movie images via the operation unit 16, similarly to the first embodiment.

In a case where a command to play back the slow movie images has been issued, the control unit 4 buffers, in the buffer memory 18, the slow movie image data of the slow movie images for which the playback command was issued, as well as the still image data and the audio data recorded in the recording medium 10 in association with the slow movie image data, and performs processing for playing back the slow movie images, the still images, and the audio. With respect to the processing for playing back the slow movie images and the still images, the processing is similar to the first embodiment, and therefore a description thereof has been omitted.

The control unit 4, in order to give the impression that the slow movie images are played back, causes the speaker 14 to output, for a short duration, audio with a reduced volume between the audio having already been outputted from the speaker 14 and the audio to be played, back together with the slow movie images. In other words, after the audio being outputted from the speaker 14 is momentarily muted, the audio buffered in the buffer memory 18 starts to be played back. Specifically, the slow movie images and the still images are played back at the same time that the audio based on the predetermined period worth of audio data is repeatedly played back. At such a time, processing such as where the audio fades in is executed on the audio from when the playback of the slow movie images and audio starts, over a predetermined duration (about 0.5 seconds).

In order to play back the audio based on the predetermined period worth of audio data, as a repeating unit, a cross-fade or similar processing may also be executed for a predetermined duration on the audio between two repeating units. Processing such as for increasing or lowering the frequency of audio may also be executed every repeating unit. In such a case, more impressive slow movie images and still images can be played back.

Based on the electronic camera according to the sixth embodiment, only a predetermined period worth of audio is recorded into the recording medium with respect to periodic audio, and therefore the amount of data recorded in the recording medium can be reduced.

Processing for when slow movie images and still images are played back in an electronic camera 2 according to a seventh embodiment shall now be described.

Firstly, when the user operates the command dial and sets the playback mode, the control unit 4 moves to the playback mode, similarly to the first embodiment. The control unit 4 then determines whether or not the user has issued a command to play back the slow movie images via the operation unit 16, similarly to the first embodiment.

In a case where a command to play back the slow movie images has been issued, the control unit 4 buffers, in the buffer memory 18, the slow movie image data of the slow movie images for which the playback command was issued, as well as the still image data and the audio data recorded in the recording medium 10 in association with the slow movie image data.

Next, the control unit 4 acquires the playback time of the audio based on the audio data, and performs processing for playing back the slow movie images, the still images, and the audio, on the basis of the acquired playback time of the audio. Specifically, the playback time of the audio is compared with a reference image playback time (which, in the present embodiment, is 10 seconds) found by adding a reference playback time for slow movie images (which, in the present embodiment, is 2.5 seconds) and a reference display time for still images (which, in the present embodiment, is 7.5 seconds); the display time of the still images is adjusted to match to the playback time of the audio and playback is performed.

In a case where, for example, the playback time of the audio is less than 10 seconds, then the control, unit 4 plays back the slow movie images for the reference playback time, and thereafter displays the still images for a duration shorter than the reference display time, i.e., until the playback of the audio is terminated. In a case where, for example, the playback time of the audio is longer than 10 seconds, then the control unit 4 plays back the slow movie images for the reference playback time, and thereafter displays the still images for a duration longer than, the reference display time, i.e., until the playback of the audio is terminated.

Based on the electronic camera according to the seventh embodiment, in a case where a plurality of sets of slow movie images and still images are played back, then it is possible to play back slow movie images based on the slow movie image data and still images based on still image data associated with the audio data worth one audio, in accordance with the playback time of the audio. As such, it is possible to reduce the awkwardness occurring due to when the playback of the next set of slow movie images starts while the audio is still being played back, or when the still images continue to be displayed while the playback of the audio has been terminated.

In the seventh embodiment, the configuration is such that the display time of the still images is adjusted to match the playback time of the audio, but a configuration may also be adopted in addition to or instead of this configuration, wherein the control unit 4 adjusts the playback speed of the slow movie images.

Also, in the seventh embodiment, when the slow movie images and still images are played back, a fade-in, fade-out, or other similar transition effect may be executed on the slow movie images and still images, similarly to the processing in the first embodiment; alternatively, a fade-in, fade-out, or other similar processing may be executed on the audio.

In each of the embodiment above, the configuration is such that the still images are played back after the slow movie images are played back, but the configuration may also be such that only a plurality of sets of slow movie images are played back in succession. In such a case, in a case where the playback time of the audio based on the audio data is longer than the playback time of the slow movie images, then audio including the best position, indicated by the user as per the processing in the third embodiment, may be played back simultaneously with the slow movie images, or audio including the peak position of the audio level as per the processing in the fourth embodiment may foe played back simultaneously with the slow movie images. Further, the playback speed of the slow movie images may be adjusted before playback, or the audio based on the audio data may be played back unaltered.

In each of the embodiments above, the configuration is such that the audio data, is recorded in the recording medium 10 in association with the slow movie image data, and the still image data, but in a case where the playback time of the audio based on the audio data, is longer than the playback time of the slow movie images based on the slow movie image data and the playback time of the still images based on the still image data, then the playback time of the audio based, on the audio data, may also be shortened and new audio data may be generated and recorded in the recording medium 10; alternatively, only a necessary portion may be played back to match the playback times of the slow movie images and the still images. In such a case, in a case where the new audio data is generated, the new audio data generated has a playback time at least as long as the playback time of the slow movie images based on the slow movie image data.

In each of the embodiments above, the configuration is such that the audio is recorded when the frame images are being captured and the slow movie image data and still image data based on the frame images are associated with the audio data based on the recorded audio, but the configuration may also be such that the audio data based on the recorded audio can be replaced with separate audio data, such as audio data that has been prepared in advance.

Figure 9:
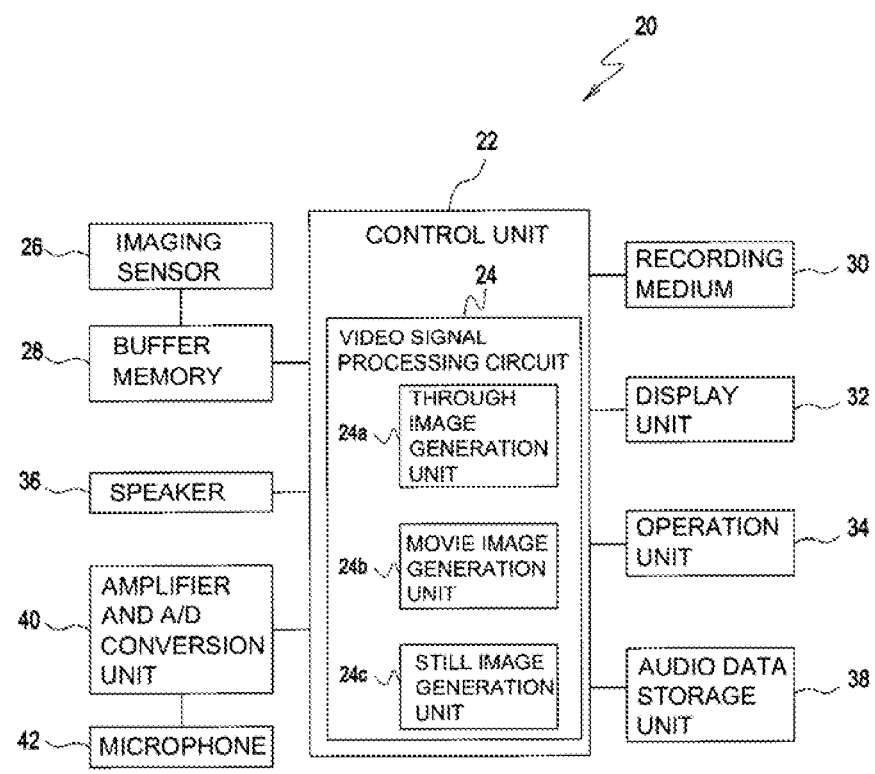
FIG. 9 is a block diagram illustrating a system configuration of an electronic camera according to an eighth embodiment.

Next, an electronic camera serving as an imaging device according to an eighth embodiment snail now be described, with, reference to the accompanying drawings. FIG. 9 is a block diagram illustrating a system, configuration of the electronic camera according to the eighth embodiment. As illustrated in FIG. 9, an electronic camera 20 is provided with a control unit 22 for overall control of each of the parts of the electronic camera 20, the control unit being constituted of a microprocessor or the like. The control unit 22 has a video signal processing circuit 24, and the video signal processing circuit 24 has a through image generation unit 24a for generating through image data displayed on a display unit 32 (described below), as well as a movie image generation unit 24b for generating movie image data and a still, image generation unit 24c for generating still image data. The control unit 22 is connected to a buffer memory 28, a recording medium 30, a display unit 32, an operation unit 34, a speaker 36, an audio data storage unit 38, and an amplifier and A/D conversion unit 40.

An imaging sensor 26 is constituted of a CCD, a CMOS, or the like, and images light from a subject via an imaging lens (not shown); the buffer memory 28 temporarily stores image data based on an imaging signal outputted from the imaging sensor 26 and converted from an analog signal to a digital signal by passing through an A/D converter (not shown).

In a case where the electronic camera 20 is set to, for example, a slow-motion movie image capturing mode for capturing slow-motion movie images (described below) (hereinafter called slow movie images), then the buffer memory 28 sequentially stores a plurality of sets of image data based on the imaging signal outputted from the imaging sensor 26 synchronously with a movie image cycle (60 fps (frames/second), for example), i.e., stores a plurality of frame images constituting the slow movie images. In the present embodiment, the buffer memory 28 sequentially stores frame images having the number of pixels specified under Full High Definition (1920×1080 pixels), i.e., high-resolution frame images, in a FIFO (first in first out) scheme.

The recording medium 30 is a portable recording medium detachably mounted onto a card slot (not shown) provided to the electronic camera 20, and is, for example, a CF card, an 3D card, or smart media. The recording medium 30 records movie image data or slow-motion movie image data (hereinafter called slow movie image data) created by the movie image generation unit 24b, within the control unit 22, which executes resize processing (from high to low resolution) to a resolution for movie images, image processing for movie images, and compression processing for movie images, for each of the frame images stored in the buffer memory 28. The recording medium 30 also records still image data created by the still image generation unit 24c, within the control unit 22, which executes image processing for still images and compression processing for still images on a frame image stored in the buffer memory 28, as well as information relating to image capturing, and the like, and also audio data created by the control unit 22, which executes a predetermined process on raw audio data stored in the audio data storage unit 38.

The display unit 32 is constituted of a monitor constituted of an LCD or the like or of an EVF or the like, disposed on a back surface part of the electronic camera 20, and produces a display such as of through images generated by the through image generation unit 24a, movie images based on movie image data recorded in the recording medium 30, slow movie images based on slow-motion movie image data, still images based on still image data, and information relating to the image capturing.

The operation unit 34 is configured to comprise: a power source switching that turns on or off a power source of the electronic camera 20; a command dial for setting a capturing mode, such as a movie image capturing mode for capturing movie images or a slow-motion movie image capturing mode for capturing slow movie images; a release button that issues a command such as to start capturing movie images or still images; a menu button that causes the display unit 32 to display a menu or the like; a cross-key to be operated when menu items or the like are selected or when a variety of settings are being made; an OK button for confirming the selection of a menu item or a variety of different settings; a playback button that causes the display unit 32 to display the movie image data or still image data recorded in the recording medium 30; and the like.

The speaker 36 outputs audio based on the audio data recorded in the recording medium 30. The amplifier and A/D conversion unit 40 converts an analog signal of audio in the periphery of the electronic camera 20 collected by a microphone 42 into a digital signal and outputs the converted digital signal of audio to the control unit 22. The control unit 22 creates raw audio data from the digital signal of audio outputted from the amplifier and A/D conversion unit 40. The audio data storage unit 38 temporarily stores the raw audio data.

With the electronic camera 20 according to the eighth, embodiment, slow movie image data outputted from the imaging sensor 26 and played back at a second frame rate lower than a first frame rate indicative of the number of frame images stored in a unit of time in the buffer memory 28 is generated, still image data based on at least one frame image of the plurality of frame images forming the slow movie image data is generated, and the generated slow movie image data and still image data are recorded in the recording medium 30 in association with each other. The raw audio data collected by the microphone 42 and generated by the amplifier and A/D conversion unit 40 is processed to create audio data, which is recorded in the recording medium 30 in association with the slow movie image data and the still image data.

Processing for a case when slow movie images are captured, still images are captured, and audio is recorded in the electronic camera 20 according to the eighth embodiment shall now be described, with reference to the accompanying drawings.

In the eighth embodiment, slow movie image data is generated on the basis of the plurality of frame images stored in the buffer memory 28 from the inputting of the still image capturing command until prior to a sixth predetermined duration, and on the basis of the plurality of frame images stored in the buffer memory 26 from when the frame images serving as the still image data were stored in the buffer memory 28 until after a seventh predetermined duration. In other words, slow movie image data is generated on the basis of the plurality of frame images stored in the buffer memory 28 during a predetermined duration (the sixth predetermined duration+ the seventh predetermined duration), and still image data is generated on the basis of the frame images stored in the buffer memory 28 upon the termination of the sixth predetermined duration (upon the start of the seventh predetermined duration). The predetermined duration (for example, 1 second), the sixth predetermined duration (for example, 0.6 seconds), and the seventh predetermined duration (for example, 0.4 seconds) are pro-set and stored in a memory (not shown) or the like, and are configured so as to be changeable.

In the eighth embodiment, audio data for audio to be played back during the slow movie image playback is generated on the basis of the audio stored in the audio data storage unit 38 from when the frame image serving as the still image data was stored in the buffer memory 28 until, prior to an eighth predetermined duration, and on the basis of audio data stored in the audio data storage unit 38 from when the frame image serving as the still image data was stored in the buffer memory 28 until after a ninth predetermined duration. In other words, audio data to be played back during the slow movie image playback is generated on the basis of the audio data stored in the audio data storage unit 38 during a predetermined duration (the eighth predetermined duration+the ninth predetermined duration). The eighth predetermined duration (for example, 9.6 seconds) and the ninth predetermined duration (for example, 0.4 seconds) are pre-set, stored in a memory (not shown) or the like, and configured so as to be changeable.

Figure 10:
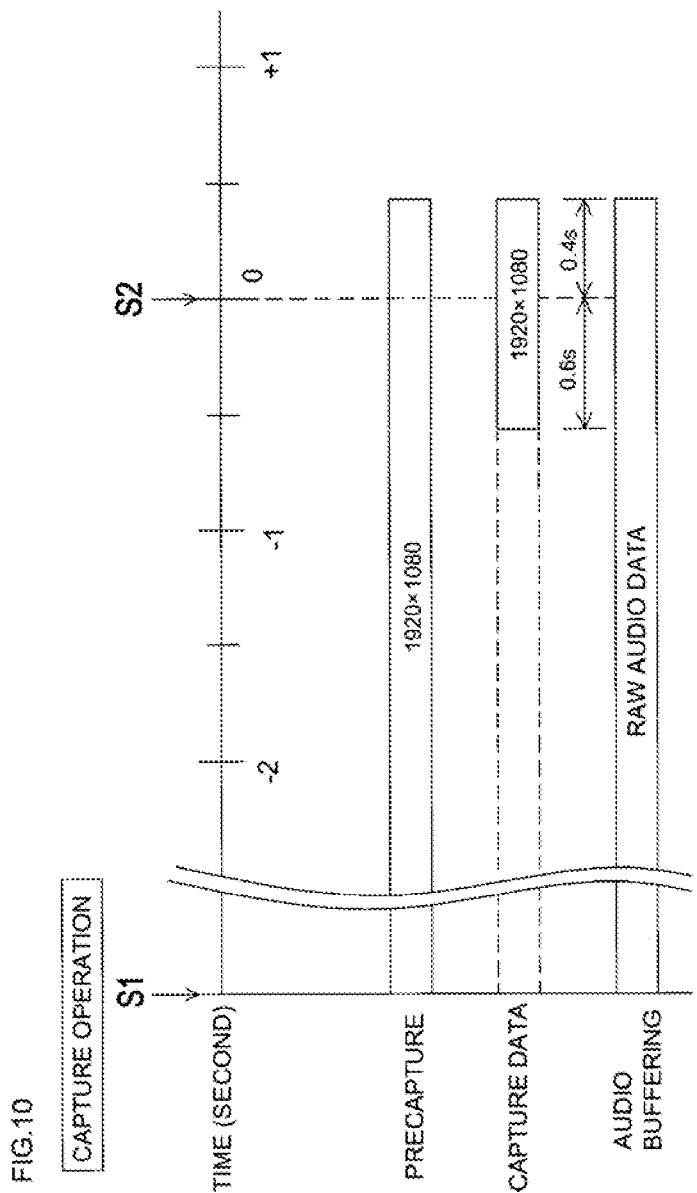
FIG. 10 is a time chart illustrating a capture operation for frame images and raw audio data in the electronic camera according to the eighth embodiment.

When a user operates the command dial to thereby set the capturing mode to the slow-motion movie image capturing mode, the control unit 22 moves to the slow-motion movie image capturing mode for capturing slow movie images, capturing still images related to the slow movie images, and recording audio related to the slow movie images. Next, the control unit 22 determines whether or not the release button has been depressed halfway by the user. As illustrated in FIG. 10, when the release button is depressed halfway (S1), the control unit 22 starts to prepare to capture the slow movie images and the still images, i.e., starts focusing on the primary subject, and in order to capture the slow movie images and record audio relating to the slow movie images, starts pre-capturing frame images into the buffer memory 28 and buffering audio into the audio data storage unit 38.

In the eighth embodiment, slow movie image data is generated on the basis of the frame images stored in the buffer memory 28 from when the user depressed the release button entirely (S2) until prior to the sixth predetermine duration and from when the user depressed the release button entirely (S2) until after the seventh predetermined duration. As such, in a pre-capture operation illustrated in FIG. 10, in a case where the buffer memory 28 has a storage region capable of storing, for example, 1 second worth of frame images, then after the 1 second worth of frame images has been stored in the buffer memory 28, processing for deleting the oldest frame image in the buffer memory 28 and storing a generated frame image (the newest frame image) in the buffer memory 28 is repeated every time a frame image is generated until the time when the release button is depressed entirely (S2).

Also, in a case where the audio data storage unit 38 has a storage region capable of storing, for example, 10 seconds worth of audio, then after the 10 seconds worth of audio have been stored in the audio data storage unit 38, processing for deleting the oldest audio data in the audio data storage unit 38 and storing outputted audio data (the newest audio data) in the audio data storage unit 38 in a FIFO scheme is repeated every time audio data is outputted from the amplifier and A/D conversion unit 40 until the time when the release button is depressed entirely (S2).

Next, the control unit 22 determines whether or not the release button has been depressed entirely (S2) while the frame images were being repeatedly stored in the buffer memory 28 and the audio data was being repeatedly stored in the audio data storage unit 38. When the release button is depressed entirely, the control unit 22 determines that a still image capturing command issuing a command for the generation of still image data has been inputted, and terminates the sixth predetermined duration and the eighth predetermined duration and starts the seventh predetermined duration and the ninth predetermined duration.

The control unit 22 repeats processing for deleting the oldest frame image in the buffer memory 28 and storing the generated frame image (the newest frame image) in the buffer memory 28 every time a frame image is generated, until the seventh predetermined duration has elapsed. Also, the control unit 22 repeats processing for deleting the oldest audio data in the audio data storage unit 38 and storing the outputted audio data (the newest audio data) in the audio data storage unit 38 in a FIFO scheme every time the audio data is outputted, until the ninth predetermined duration has elapsed.

In a case where the seventh predetermined duration and the ninth predetermined duration have elapsed, the control unit 22 terminates the buffering of the frame images in the buffer memory 28 and the buffering of the audio data in the audio data storage unit 38.

FIG. 10 illustrates a case where the sixth predetermined duration is 0.6 seconds, the eighth predetermined duration is 9.6 seconds, and the seventh predetermined duration and ninth predetermined duration are each 0.4 seconds, but in a case where the ninth predetermined duration is longer than the seventh predetermined duration, the control unit 22 notifies the user that the buffering of the audio data has not been terminated when the seventh predetermined duration has elapsed. Herein, the notification to the user may be performed by having the display unit 32 display an image or text indicating that the audio data is being buffered, or may be performed, by having the display unit 32 display an indicator or the like indicating the elapsed time where the audio data has been buffering. The user may also be notified that the buffering of the audio data has not terminated by having the display unit 32 display the remaining time until the termination of the buffering.

Figure 11:
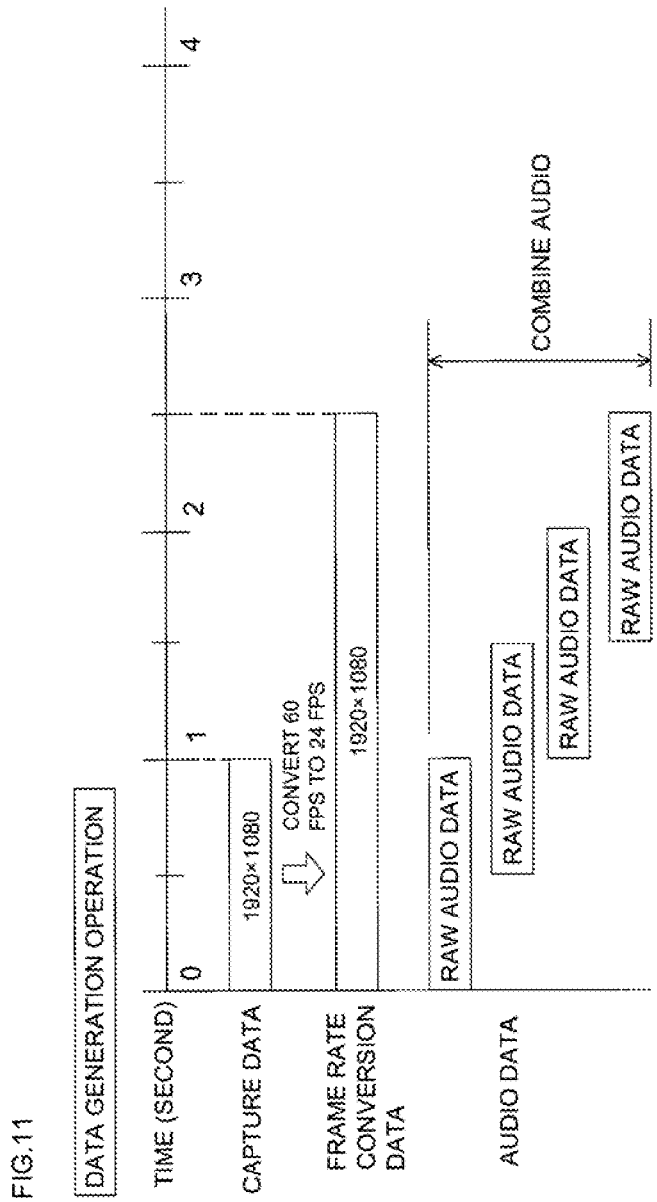
FIG. 11 is a diagram illustrating processing for generating slow-motion movie image data and audio data in the electronic camera according to the eighth embodiment.

When the frame image pre-capture and the audio buffering are terminated, the control unit 22 generates slow movie image data, still image movie data, and audio data to be played back during the playback of the slow movie images, firstly, a description of the processing for generating the slow movie image data shall be provided. The control unit 22, as illustrated in FIG. 10 generates slow movie image data on the basis of the plurality of frame images buffered in the buffer memory 28 from when the release button was depressed entirely until prior to the sixth predetermined duration (which, in the present embodiment, is 0.6 seconds) and on the basis of the plurality of frame images buffered in the buffer memory 28 from when the release button was depressed until after the seventh predetermined duration (which, in the present embodiment, is 0.4 seconds). Specifically, as illustrated in FIG. 11, the frame images (the capture data illustrated in FIG. 11) stored in the buffer memory 28 at a first frame rate (for example, 60 fps) identical to the frame rate outputted from the imaging sensor 26 (the imaging frame rate) are read out from the buffer memory 28 at a second frame rate lower than the first frame rate (for example, 24 fps, which is 1/2.5 of the first frame rate) and the read-out frame images are subjected to resolution resize processing for movie images (from a larger to smaller resolution) and image processing for movie images (including movie image compression processing) by the movie image generation unit 24b within the control unit 22, whereby the slow movie image data (the frame rate conversion data illustrated in FIG. 11) is created. As such, the playback time of the slow movie images created in the present embodiment is 2.5 seconds, as illustrated in FIG. 11.

When the release button is depressed entirely (S2), the control unit 22 generates still image data on the basis of the frame images based on the imaging signal outputted from, the imaging sensor 26. Specifically, when the release button is depressed entirely (S2), the frame images stored in the buffer memory 28 are read out from the buffer memory 28, and the read-out frame images are subjected to image processing for still images (including still image compression processing) by the still image generation unit 24c within the control unit 22, whereby the still image data is generated.

From the audio data buffered in the audio data storage unit 38, the control unit 22 extracts audio data buffered in the audio data storage unit 38 from when the release button was depressed entirely (S2) until prior to 0.6 seconds, and audio data (raw audio data) buffered in the audio data storage unit 38 from when the release button was depressed entirely (S2) until after 0.4 seconds, i.e. audio data buffered in the audio data storage unit 38 during the time when the frame images used in the generation of the slow movie images are stored in the buffer memory 28; the extracted audio data is processed to generate audio data to be played back during playback of the slow movie images. In other words, as illustrated in FIG. 11, 1 second worth of the extracted raw audio data is woven together by repeatedly overlapping four times by 0.5 second intervals to thereby generate 2.5 seconds worth of audio data.

Next, the control unit 22 records the generated slow movie image data, the generated still image data, and the generated audio data in the recording medium 30, in association with each other.

Next, processing for when slow movie images, still images, and audio are played back in an electronic camera 20 according to an embodiment shall now be described, with reference to the time chart illustrated in FIG. 12. Firstly, when the user operates the command dial and sets the playback mode, the control unit 22 moves to a playback mode for playing back slow movie images based on slow movie image data, recorded in the recording medium 30, still, images based on still image data, and audio based on audio data. The question of whether or not the user has issued a command to play back slow movie images via the operation unit 34 is determined.

In a case where a command to play back the slow movie images has been issued, the control unit 22 reads out from, the recording medium 30 the slow movie image data for the slow movie images for which the playback command was issued, as well as the still image data and the audio data recorded in association with the slow movie image data, and starts to play back the slow movie images and to play back the audio.

Herein, the control unit 22, in order to give the impression that the slow movie images are played back, performs transition effect processing such as where the slow movie images fade in from the start of the playback of the slow movie images over the course of a predetermined duration (which, in the present embodiment, is 0.5 seconds). In other words, the slow movie image playback is started while the slow movie images are being faded in, as illustrated in FIG. 12. Also, the control unit 22 performs processing on the audio such as where the audio fades in from, the start of the playback of the audio over the course of a predetermined duration (which, in the present embodiment, is 0.5 seconds).

In FIG. 12, when the playback of the slow movie images and the audio starts, the duration where the transition effect is performed on the slow movie images and the duration where the processing is performed on the audio are given the same length, but the lengths may also be different.

The control unit 22 then continues to play back the slow movie images and the audio, and performs transition effect processing such as where the slow movie images fade out from a predetermined duration (which, in the present embodiment, is 0.5 seconds) prior to the termination of the playback of the slow movie images until the termination of the playback of the slow movie images. Thereafter, the still images are played back for 7.5 seconds, but transition effect processing is performed such as where the still images fade in from the start of the playback of the still images over the course of a predetermined duration (which, in the present embodiment, is 0.5 seconds). Furthermore, transition effect processing is also performed such as where the still images fade out from the termination of the playback of the still images over the course of a predetermined duration (which, in the present embodiment, is 0.5 seconds). Herein, the playback of the audio continues until the termination of the playback of the still images. In other words, 2.5 seconds worth of audio is played back four repetitive times, whereby 10 seconds of audio, which is the playback time of the slow movie images and the still images, is played back. The playback of the audio may also be terminated when the playback of the slow movie images is terminated. Herein, in a case where the user has issued a command to discontinue the display the still images via the operation unit 34 while the still images are being played back, then the control unit 22 discontinues the display of the still images. In such a case, the playback of the audio is also discontinued when the display of the still images is discontinued.

Based on the electronic camera according to the eighth embodiment, it is possible to record audio expressing the atmosphere when the images were captured, together with the slow movie images. It is also possible to play back audio expressing the atmosphere when the images were captured, while the slow movie images are played back.

In the eighth embodiment, the raw audio data buffered during the duration where the frame images used to generate the slow movie images were stored, is extracted, and the extracted raw audio data is repeatedly woven together in a partially overlapping manner to generate audio data to be played back during the playback of the slow movie images and the still images, but the extracted raw audio data may also be repeatedly woven together without overlapping to generate the audio data to be played back during the playback of the slow movie images and the still images. Herein, in a case where the raw audio data is repeatedly woven together in a partially overlapping manner, the raw audio data may be repeatedly woven such that the preceding raw audio data is being faded out along with the following raw audio data is being faded in.

Also, in the eighth embodiment, the playback time of the slow movie images and of the still images is 10 seconds, but because 10 seconds worth of raw audio data is buffered in the audio data storage unit 38, the 10 seconds worth of raw audio data may also be played back unaltered during the playback of the slow movie images and the still images.

In the eighth embodiment, the raw audio data from when the release button was depressed entirely (S2) until prior to the eighth predetermined duration and also raw audio data from when the release button was depressed entirely (S2) until after the ninth predetermined duration are used to generate the audio data to be played back during the playback of the slow movie images and the still images, but any arbitrary portion of the raw audio data stored in the audio data storage unit 38 ray also be used to generate the audio data to be played back during the playback of the slow movie images and the still images.

In the eighth embodiment, the raw audio data buffered during the duration where the frame image used to generate the slow movie images was stored is extracted and the extracted raw audio data is repeatedly woven together to generate the audio data to be played back during the playback of the slow movie images and the still images, but audio data having a plurality of different frequencies may also be created from the extracted raw audio data, end the audio data having different frequencies may be overlapped together to generate audio data to be played back during the playback of the slow movie images and the still images.

In a case where the raw audio data is overlapped in the eighth embodiment, the degree of overlap may be determined by image information recognized by facial recognition or the like. For example, the control unit 22 may perform facial recognition processing on the frame images and determine the degree to which the raw audio data is overlapped (the width of overlap) as well as the amount of raw audio data to be overlapped, in accordance with the number of faces recognized. This makes it possible to cause the audio data to reflect the atmosphere during image capturing in a case where a plurality of people are photographed in the frame images constituting the slow movie image data.

Also, the raw audio data, when being overlapped, may be processed such that each of the raw audio data sets being overlapped has a different pitch, or may be processed such that each of the raw audio data being overlapped has a different playback speed, and the plurality of processed raw audio data sets may be overlapped. Each of the raw audio data sets may also be processed, so as to have different volumes and the plurality of processed raw audio data sets may be overlapped. Furthermore, the plurality of raw audio data sets may also be overlapped after being slightly off-set, to thereby play back, during the playback of the slow movie images and the still images, audio sounding as though there is an echo.

In the eighth embodiment, a portion of the raw audio data containing feature sound in accordance with the imaging scene may also be extracted from the raw audio data stored in the audio data storage unit 38, and the extracted raw audio data may be processed to generate the audio data to be played back during the playback of the slow movie images and the still images, in such a case, the imaging scene may be recognized on the basis of the capturing mode that is set, or may be recognized by an analysis of the raw audio data stored in the audio data storage unit 38.

Further, in the eighth embodiment, a portion of the raw audio data including the peak value of the audio level may also foe extracted from the raw audio data stored in the audio data storage unit 38, and a process such as for weaving together or overlapping a plurality of sets of extracted raw audio data may be performed to generate the audio data to be played back during the playback of the slow movie images and the still images.

Further, in the eighth embodiment, in a case where a part of the audio buffered in the audio data storage unit 38 is used, a plurality of portions of the buffered raw audio data may be extracted and the extracted raw audio data may be processed to generate the audio data to be played back during the playback of the slow movie images and the still images.

The above-described embodiments have been recited in order to facilitate understanding of the present invention, and are not recited in order to limit the present invention. Accordingly, in effect, each element disclosed in the above-described embodiments also includes ail design changes and equivalents failing within the technical scope of the present invention.

The invention claimed is:

1. An imaging device, comprising:
   a storage unit that sequentially stores (i) a plurality of frame images based on an imaging signal from an imaging sensor that images light from a subject, and (ii) raw recorded audio data based on an audio signal from a sound collector that acquires audio;
   a movie image data generation unit that generates slow-motion movie image data to be played back at a second frame rate lower than a first frame rate indicative of the number of frame images stored in the storage unit in a unit of time, based on the plurality of frame images stored in the storage unit during a first predetermined duration;
   a still image data generation unit that generates still image data based on at least one frame image from among the plurality of frame images stored in the storage unit during the first predetermined duration;
   an audio data generation unit that generates audio data including (1) first audio data, which is shorter than a second predetermined duration and includes the raw recorded audio data at a first position, and (2) second audio data, which is shorter than the second predetermined duration and includes the raw recorded audio data at a second position different from the first position, the raw recorded audio data being stored simultaneously with a start time of the first predetermined duration and during the second predetermined duration, the second predetermined duration being longer than the first predetermined duration; and
   a recording control unit that separately records in a recording medium the first audio data and the second audio data generated by the audio data generation unit in association with the slow-motion movie image data generated by the movie image data generation unit and the still image data generated by the still image data generation unit, respectively.

2. The imaging device according to claim 1, further comprising:
   a determination unit that determines whether or not a still image capturing command issuing a command to generate the still image data has been inputted while the storage unit is sequentially storing the plurality of frame images, wherein
      the movie image data generation unit generates the slow-motion movie image data on the basis of the plurality of frame images stored in the storage unit from when the determination unit determined that the still image capturing command had been inputted until prior to a third predetermined duration, and on the basis of the plurality of frame images stored in the storage unit from when the determination unit determined that the still image capturing command had been inputted until after a fourth predetermined duration;

the still image data generation unit generates still image data on the basis of the frame image stored in the storage unit when the determination unit determined that the still image capturing command had been inputted or before and/or after such a time; and the audio data generation unit generates the audio data on the basis of the raw recorded audio data stored in the storage unit from when the determination unit determined that the still image capturing command had been inputted until prior to the third predetermined duration, and on the basis of the raw recorded audio data stored in the storage unit from when the determination unit determined that the still image capturing command had been inputted until after a fifth predetermined duration longer than the fourth predetermined duration.

3. The imaging device according to claim 2, further comprising:
a termination determination unit that determines whether or not an audio recording termination command issuing a command for the termination of the acquisition of audio by the sound collector has been inputted while the storage unit is sequentially storing the raw recorded audio data, wherein
the time when the termination determination unit determines that the audio recording termination command has been inputted serves as a termination time for the fifth predetermined duration.

4. The imaging device according to claim 2, wherein the determination unit detects the audio level of the audio acquired by the sound collector while the storage unit is sequentially storing the plurality of frame images and the raw recorded audio data, and determines that the still image capturing command has been inputted in a case where the audio level is a predetermined threshold or higher.

5. The imaging device according to claim 2, further comprising:
a facial recognition unit that recognizes a facial region of the subject within the frame images, wherein
the determination unit determines that the still image capturing command has been inputted on the basis of the state of a face recognized by the facial recognition unit.

6. The imaging device according to claim 1, further comprising:
an indication unit that indicates the position of the raw recorded audio data stored in the storage unit, wherein
the time when the storage unit starts storing the plurality of frame images and the raw recorded audio data serves as the start time of the second predetermined duration, and
the audio data generation unit generates the audio data on the basis of the position indicated by the indication unit in the raw recorded audio data stored during the second predetermined duration.

7. The imaging device according to claim 1, further comprising
a movement information detection unit that detects movement information on the subject in the plurality of frame images, wherein the start time and termination time of the second predetermined duration are determined on the basis of the movement information.

8. The imaging device according to claim 1, wherein in a case where the raw recorded audio data acquired by the sound collector is a repetition of periodic audio, the audio data generation unit generates the audio data on the basis of at least one period worth of the audio.

9. The imaging device according to claim 1, further comprising a notification unit that provides a notification that raw recorded audio data for generating the audio data is being acquired.

10. The imaging device according to claim 1, further comprising:
an image playback unit that plays back still images based on the slow-motion movie image data generated by the movie image data generation unit and the still image data generated by the still image data generation unit; and
an audio playback unit that plays back audio based on the audio data generated by the audio data generation unit during the playback time executed by the image playback unit.

11. An image-audio playback device, comprising:
a storage unit that stores slow-motion movie image data relating to slow-motion movie images generated based on a plurality of frame images acquired during a first predetermined duration based on an imaging signal from an imaging sensor that images light from a subject and played back at a second frame rate lower than a first frame rate indicative of the number of frame images generated on the basis of the imaging signal in a unit of time, still image data to be generated on the basis of at least one frame image from among the plurality of frame images, first audio data and second audio data that are generated based on raw recorded audio data acquired simultaneously with a start time of the first predetermined duration and during a second predetermined duration longer than the first predetermined duration, from a sound collector that separately acquires audio, in association with the slow-motion movie image data and the still image data, respectively;
an image display control unit that controls so that a display unit displays the slow-motion movie images based on the slow-motion movie image data stored in the storage unit or a still image based on the still image data; and
an audio output control unit that controls so that an audio output unit outputs audio based on the first audio data or the second audio data during the image display control effected by the image display control unit, wherein
the first audio data, which is shorter than the second predetermined duration, is based on the raw recorded audio data included at a first position, and
the second audio data, which is shorter than the second predetermined duration, is based on the raw recorded audio data included at a second position different from the first position.

12. The image-audio playback device according to claim 11, further comprising
an indication unit that indicates a position of at least one of the first audio data and the second audio data stored in the storage unit, wherein
the audio output control unit outputs audio based on at least one of the first audio data and the second audio data determined in accordance with the indicated position.

13. The image-audio playback device according to claim 11, further comprising:

an image control unit that performs fade processing on at least one portion of the starting portion or terminating portion of the slow-motion movie images displayed by the display unit or the starting portion or terminating portion of the still image; and an audio control unit that performs fade processing on at least one portion of the starting portion or terminating portion of the audio outputted by the audio output unit.

14. The image-audio playback device according to claim 11, wherein the audio output control unit adjusts the output time of the audio based on at least one of the first audio data and the second audio data, in accordance with the display time of the slow-motion movie images and the still image.

15. The image-audio playback device according to claim 11, wherein the image display control unit adjusts the playback time of the slow-motion movie images and the still image in accordance with the output time of the audio.

16. The image-audio playback device according to claim 11, wherein the display of the still image is terminated in a case where a termination command issuing a command to terminate the display has been inputted while the still image is being displayed by the display unit.

17. An imaging device, comprising:
an imaging sensor that images light from a subject;
a storage unit that sequentially stores a plurality of frame images based on an imaging signal from the imaging sensor;
a movie image data generation unit that generates data on slow-motion movie images to be played back at a second frame rate lower than a first frame rate indicative of the number of the frame images stored in the storage unit in a unit of time, based on the plurality of frame images stored in the storage unit in a predetermined duration;
a raw audio data recording unit that records raw audio data associated with the slow-motion movie images;
an audio data generation unit that processes the raw audio data and generates audio data to be played back during the playback of the slow-motion movie images;
an image playback unit that plays back the slow-motion movie images based on the data on the slow-motion movie images; and
an audio playback unit that plays back the audio data generated by the audio data generation unit, during the playback of the slow-motion movie images, wherein
the audio data generation unit at least partially overlaps and repeatedly weaves the raw audio data recorded by the raw audio data recording unit to generate the audio data.

18. The imaging device according to claim 17, wherein the raw audio data recording unit records the raw audio data at least one time from among: during the predetermined duration, prior to the predetermined duration, or after the predetermined duration.

19. The imaging device according to claim 17, further comprising
a still image data generation unit that generates data on at least one still image relating to the plurality of frame images stored in the storage unit during the predetermined duration, wherein
the image playback unit plays back the at least one still image following the playback of the slow-motion movie image; and the audio playback unit plays back the audio data generated by the audio data generation unit during the playback of the at least one still image.

20. The imaging device according to claim 17, wherein the audio data generation unit repeatedly weaves the raw audio data recorded by the raw audio data recording unit to generate the audio data.

21. The imaging device according to claim 17, wherein the audio data generation unit overlaps audio data having a plurality of different frequencies created from the raw audio data to generate the audio data.

22. The imaging device according to claim 17, wherein the audio data generation unit changes the degree to which the audio data is overlapped on the basis of the image information on the slow-motion movie images.

23. The imaging device according to claim 17, wherein audio data which is processed by the audio data generation unit is audio data including a feature sound in accordance with a capturing mode.

24. The imaging device according to claim 17, wherein audio data which is processed by the audio data generation unit is audio data including a peak value.

25. An image-audio playback device, comprising:
an image playback unit that reads out from a storage unit slow-motion movie image data that is movie image data generated based on a plurality of frame images generated based on an imaging signal from an imaging sensor that images subject light and is to be played back at a second frame rate lower than a first frame rate indicative of the number of the frame images stored in the storage unit in a unit of time, and plays back the slow-motion movie image data;
an audio data generation unit that at least partially overlaps and repeatedly weaves raw audio data acquired, from a sound collector that acquires audio, in association with the slow-motion movie image data and recorded in the storage unit to generate audio data; and
an audio output control unit that outputs playback audio generated based on the audio data generated by the audio data generation unit, from an audio output unit, during image playback by the image playback unit.

26. The image-audio playback device according to claim 25, wherein the audio data is generated by overlapping audio data having a plurality of different frequencies created from the raw recorded audio data.

27. The image-audio playback device according to claim 25, wherein the degree to which the audio data overlapped is changed on the basis of the image information on the slow-motion movie images.

28. The image-audio playback device according to claim 11, wherein
the slow-motion movie image data is data generated based on the plurality of frame images acquired during the first predetermined duration; and
the raw recorded audio data is data acquired during the second predetermined duration from the sound collector.

* * * * *